United States Patent
Woodgate

[19]

[11] Patent Number: 5,959,664
[45] Date of Patent: Sep. 28, 1999

[54] OBSERVER TRACKING AUTOSTEREOSCOPIC DISPLAY AND METHOD OF TRACKING AN OBSERVER

[75] Inventor: Graham John Woodgate, Oxfordshire, United Kingdom

[73] Assignee: Sharp Kabushiki Kaisha, Osaka, Japan

[21] Appl. No.: 08/579,666

[22] Filed: Dec. 27, 1995

[30] Foreign Application Priority Data

Dec. 29, 1994 [GB] United Kingdom ........... 9426334

[51] Int. Cl.⁶ .................................................. H04N 13/00
[52] U.S. Cl. ............................ 348/59; 348/51; 348/52
[58] Field of Search ............................ 348/39, 51, 52, 348/53, 57, 58, 59; 359/40

[56] References Cited

U.S. PATENT DOCUMENTS

| | | | |
|---|---|---|---|
| 4,190,856 | 2/1980 | Ricks | 348/52 |
| 4,472,737 | 9/1984 | Iwasaki | 348/52 |
| 4,649,425 | 3/1987 | Pund | 348/52 |
| 4,870,600 | 9/1989 | Hiraoka | 348/52 |
| 4,872,750 | 10/1989 | Morishita | 348/59 |
| 4,959,641 | 9/1990 | Bass et al. | 348/51 |
| 4,987,487 | 1/1991 | Ichinose et al. | 348/51 |
| 5,083,199 | 1/1992 | Borner | 348/59 |
| 5,349,379 | 9/1994 | Eichenlaub | 348/59 |
| 5,493,427 | 2/1996 | Nomura et al. | 359/40 |

FOREIGN PATENT DOCUMENTS

| | | |
|---|---|---|
| 0354851 | 2/1990 | European Pat. Off. . |
| 0404289 | 6/1990 | European Pat. Off. . |
| 0576106 | 12/1993 | European Pat. Off. . |
| 0602934 | 6/1994 | European Pat. Off. . |
| 0656555 | 6/1995 | European Pat. Off. . |
| 9406249 | 3/1994 | WIPO . |

OTHER PUBLICATIONS

Search Report for European Appl. 95309516.3, Mailed May 28, 1996.

Akiyama et al, ITEC '91: 1991 ITE Ann. Conv., "Three–Dimensional Visual Communication", pp. 607–610.

Pastoor et al, West Germany, Proceedings of the SID, vol. 30/3, 1989, pp. 217–223, "Subjective Assessments of the Resolution of Viewing Directions in a Multi–Viewpoint 3D TV System".

*Primary Examiner*—Brian L. Casler
*Assistant Examiner*—Luanne P. Din

[57] ABSTRACT

An observer tracking display is provided in which the image data displayed by at least three display devices along respective different directions is divided depending on the position of an observer. Each eye of the observer can see only some regions of the display devices. The positions and sizes of those regions are calculated for the position of the observer and the display devices are then controlled such that the observer's left eye only receives left view data and the observer's right eye only receives right eye view data.

19 Claims, 25 Drawing Sheets

Left eye image

Right eye image

OBSERVER TRACKING AUTOSTEREOSCOPIC DISPLAY AND METHOD OF TRACKING AN OBSERVER

TECHNICAL FIELD OF THE INVENTION

The present invention relates to an observer tracking autostereoscopic display and to a method of tracking an observer.

DESCRIPTION OF THE RELATED ART

It is desirable to provide an autostereoscopic display in which the three dimensional effect is perceived for a wide range of observer positions.

Methods of producing autostereoscopic images rely on presenting different views to the left and right eyes of an observer. This can be achieved by dividing the views for the left and right eyes into a series of interleaved vertical stripes. A lenticular screen is then placed adjacent the composite image such that each lenticule covers one view stripe of the left eye image and one view stripe of the right eye image.

Electrically controlled displays may also split the left and right eye images into vertical stripes and replay the images along different directions using a lenticular screen. In another arrangement, two screens may display the images for the left and right eyes, respectively, and the images therefrom can be combined by a beamcombiner. Such a display is disclosed in EP-A-0602934. A single spatial light modulator can also be driven in a time multiplexed manner to reproduce the left and right eye images, the position of a source of illumination being varied in a time multiplexed manner so as to project the different images in different directions. The displays require the viewer to be positioned in a defined viewing region to observe the 3D effect.

K. Akiyama and N. Tetsutani, "3-Dimensional Visual Communication", ITEC'91: 1991 ITE Annual Convention, disclose an observer tracking autostereoscopic display in which a liquid crystal display (LCD) is positioned in close proximity to a lenticular sheet such that each lenticule is in front of two columns of pixels of the LCD. Such an arrangement angularly multiplexes the light emitted from the columns of pixels in the display. The display is driven so as to provide interlaced left and right images for projection to the left and right eyes of an observer. Movement of the observer makes it possible for the observer's left eye to be in a position where it receives the image intended for the observer's right eye and vice versa. A position detector monitors the position of the observer's head and is arranged to swap the left and right images over in response to movement of the observer such that the correct image is presented to the correct eye.

Such a system will allow limited freedom of movement of an observer laterally with respect to the display.

EP-A-0 354 851 discloses both a "two window" and a "four window" display. As shown in FIG. 1 of the accompanying drawings, the constituent parts of the autostereoscopic image in a two window display converge at viewpoint corrected zones. Image data (i.e. part of a view) for a first two dimensional (2D) image originating from a first end of the display 5 is constrained to lie in a zone 6, whereas image data for the same 2D image originating from an opposite side of the display is constrained within a zone 8. The zones 6 and 8 overlap to provide a first viewpoint corrected zone 12 at which the whole of the first 2D image can be seen. Similarly, image data for a second 2D image is constrained to lie in zones 7 and 10 and these zones overlap to provide a second viewpoint corrected zone 14. The observer can perceive an autostereoscopic image when one of the observer's eyes is in the first viewpoint corrected zone 12 and the other of the observer's eyes is in the second viewpoint corrected zone 14. If the observer's eyes are not within the viewpoint corrected zones, the observer does not see a 3D image over the whole of the display. The optimum position for viewing the display is in a plane passing through the widest part of each viewpoint corrected zone. It is convenient to regard this plane within a single viewpoint corrected zone as defining a "window".

Such a two view display provides only very limited freedom of movement for an observer. FIG. 2 schematically illustrates, in plan view, the views seen by an observer who has moved from "windows" formed within the viewpoint corrected zones to a position nearer the display.

As noted hereinabove, parts of each 2D image are presented along different directions. In a viewpoint corrected display, the parts of each 2D image are projected in different directions with respect to position along the display such that the images converge at the viewpoint corrected zones. In a two view multilobe system, the windows within the viewpoint corrected zones form an alternating pattern showing left views and right views labelled "L" and "R", respectively, in FIG. 2. Movement of the observer 16 to the position shown in FIG. 2 results in each of the observer's eyes seeing views not intended for it. The views can be calculated by tracing the ray paths back from the boundaries between adjacent windows via each of the observer's eyes to the display 2. Solid ray path lines indicate the ray paths for the right eye, whereas broken ray path lines indicate the ray paths for the left eye. The composition of the image seen by each of the eyes is schematically illustrated by the bars 17 and 18 for the right eye "view" and left eye "view", respectively. The dark regions of the bars indicate those parts of the display from which a left view is seen whereas the light regions of the bars indicate those parts of the display from which a right view is seen. The left eye now observes a mixture of both left and right views. The right eye also observes a mixture of left and right views. If both eyes observe the same view (i.e. left or right) from a given portion of the display, then that portion is seen in 2D only. Furthermore regions of the display, such as region 19, result in the left eye receiving a right view and the right eye receiving a left view. This gives rise to a false perception of a 3D image—known as a pseudoscopic image.

As is clearly demonstrated, the autostereoscopic effect across the entirety of the display has been lost.

It is further desirable to provide a "look around" display in which the view presented to the observer is a function of the observer's position. It has been estimated that sixty views per interocular separation may be required in order to achieve an artifact free representation of a 3D image. A 500 line lenticular display having a width of 250 mm implies that the size of each lenticule will be 0.5 mm. Sixty interocular views would imply a maximum pixel size of 8 micrometers. Such a fine pixel pitch is not presently available over such a large distance. Providing such a number of views by means of a beam combiner-type display would require sixty spatial light modulators. Embodying such a display as a temporally multiplexed display would require a frame refresh rate of the order of 3 kHz.

The number of views required to provide a "look around" 3D image can be greatly reduced by using an observer tracking display, since only the views directed towards the observer's eyes need be displayed. Arrangements in which the positions of the "windows" are movable so as to move with movement of an observer are disclosed in EP 0 576 106 and EP 0 656 555.

SUMMARY OF THE INVENTION

According to a first aspect of the present invention, there is provided an observer tracking autostereoscopic display, comprising at least three image display devices arranged to direct respective images along respective different directions, an observer tracker for determining the position of an observer, and an image controller responsive to the observer tracker for dividing the image displayed by each of the image display devices such that those regions of the image display devices which emit light towards a left eye of the observer display left eye view data and those regions of the image display devices which emit light towards a right eye of the observer display right eye view data.

It is thus possible to provide an autostereoscopic display in which the observer is not constrained within a relatively small autostereoscopic viewing zone at a fixed distance from the display, but in which the observer is free to move within a greatly increased viewing zone. "View slicing" of the left and right views such that a portion of each is displayed by each display device enables the observer to move longitudinally with respect to the display.

Preferably the display has a nominal viewing position or distance at which view slicing is not required to produce a three dimensional image.

Advantageously the display has viewpoint correction to the nominal viewing position or distance.

Preferably the at least three different directions are ranges of directions and the ranges are contiguous.

The image display device may comprise a single spatial light modulator (SLM) or other image display (for example an emissive display such as a cathode ray tube) adjacent a lenticular screen. Thus the display devices are spatially multiplexed with a single SLM. Alternatively, the display devices may comprise a plurality of spatial light modulators cooperating with respective arrays of light sources in a beam combiner-type display or a single spatial light modulator operated in a time multiplexed manner in conjunction with a time multiplexed light source.

Preferably the display has an output comprising a plurality of lobes, each lobe having at least three image regions. Such an arrangement allows extended lateral movement with respect to the display.

It is thus possible to provide a display in which a single image display device is controlled so as to produce a display output comprising three or more image regions and in which the position and size of left eye and right eye image data within each of the image regions are varied in response to movement of an observer such that the observer's left eye receives a left view and observer's right eye receives a right view.

The or each light source may comprise an array of light emitting elements. The light emitting elements may be arranged into at least three groups. Each group may have the same inter-element separation and the groups may be interspersed with one another such the elements of each group are arranged in a repeating series.

In an embodiment of the present invention, a spatial light modulator is illuminated by a segmented back light via a lens array.

In a further embodiment of the present invention a spatial light modulator is positioned between first and second lenticular screens. The spatial light modulator is preferably adjacent the first lenticular screen and the pitch of the first lenticular screen is substantially equal to the pitch of the spatial light modulator. Advantageously the pitch of the second lenticular screen is substantially an integer multiple of the pitch of the first lenticular screen. A diffuser may be located intermediate the first and second lenticular screens. The first lenticular screen may be illuminated by a multi-element light source having individually controllable elements. The diffuser may be positioned such that an image of the light source, modulated by the image data presented to the spatial light modulator, is formed on the diffuser. Preferably the diffuser is located at an object plane of the second lenticular array.

The left eye and right eye view data may be sliced and combined by dedicated image processing equipment to form a composite image for presentation by each display device. Alternatively the slicing and combining of the view data may be performed under software control. The proportions and positions of the view data used to form each composite image may be stored within a look-up table so as to allow rapid response to movement of an observer. Interpolation of data in the look-up table may be used to enhance the performance of the system.

Furthermore, an observer tracking autostereoscopic display constituting an embodiment of the present invention is relatively insensitive to small errors in determining the observer's position compared with the very accurate position determination required by some prior art systems.

According to a second aspect of the present invention there is provided a method of tracking an observer with an autostereoscopic display of the type comprising at least three image display devices which direct respective images along respective different directions position of at least one observer, and dividing the image displayed by each of the image display devices such that those regions of the image display devices which emit light towards a left eye of the observer left eye view data and those regions of the image display devices which emit light towards a right eye of the observer display right eye view data.

The present invention will further be described, by way of example, with reference to the accompanying drawings, in which:

DETAILED DESCRIPTION OF THE PREFERRED EMBODIMENTS

Figure 1:
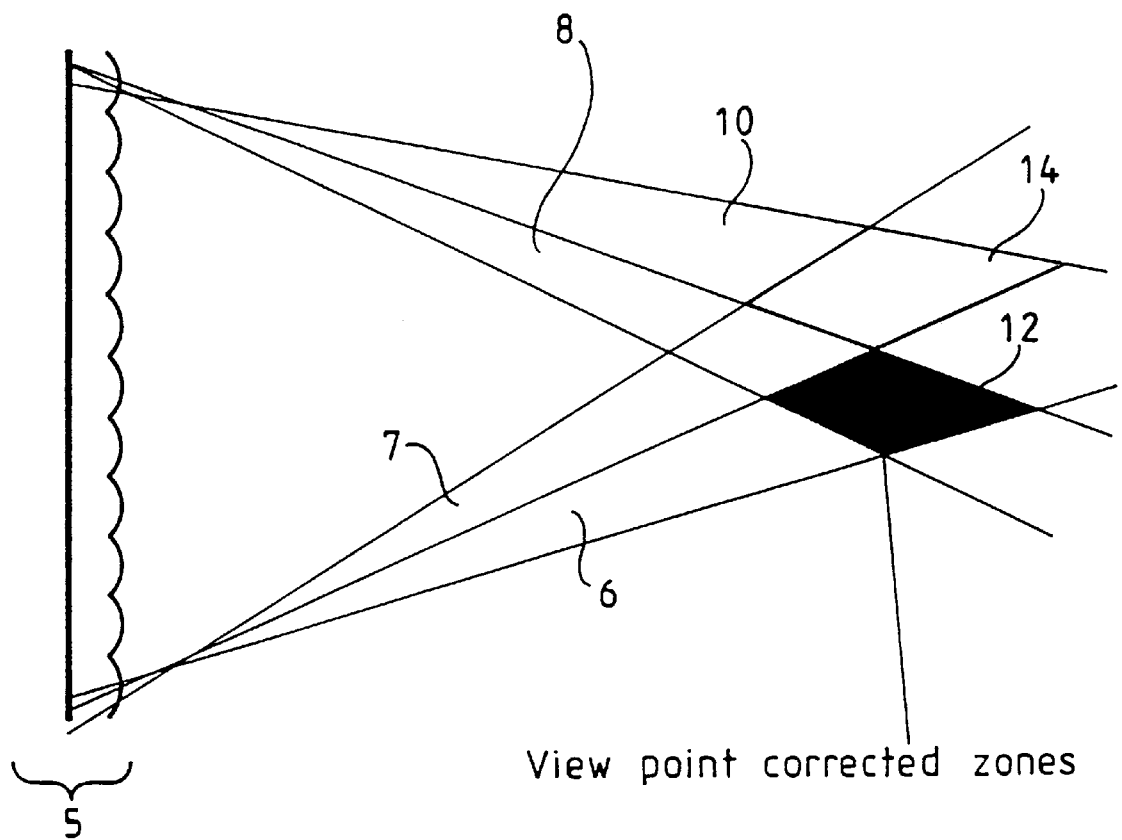
FIG. 1 is a diagram schematically illustrating the positions of viewpoint corrected zones for a two window display.
Figure 2:
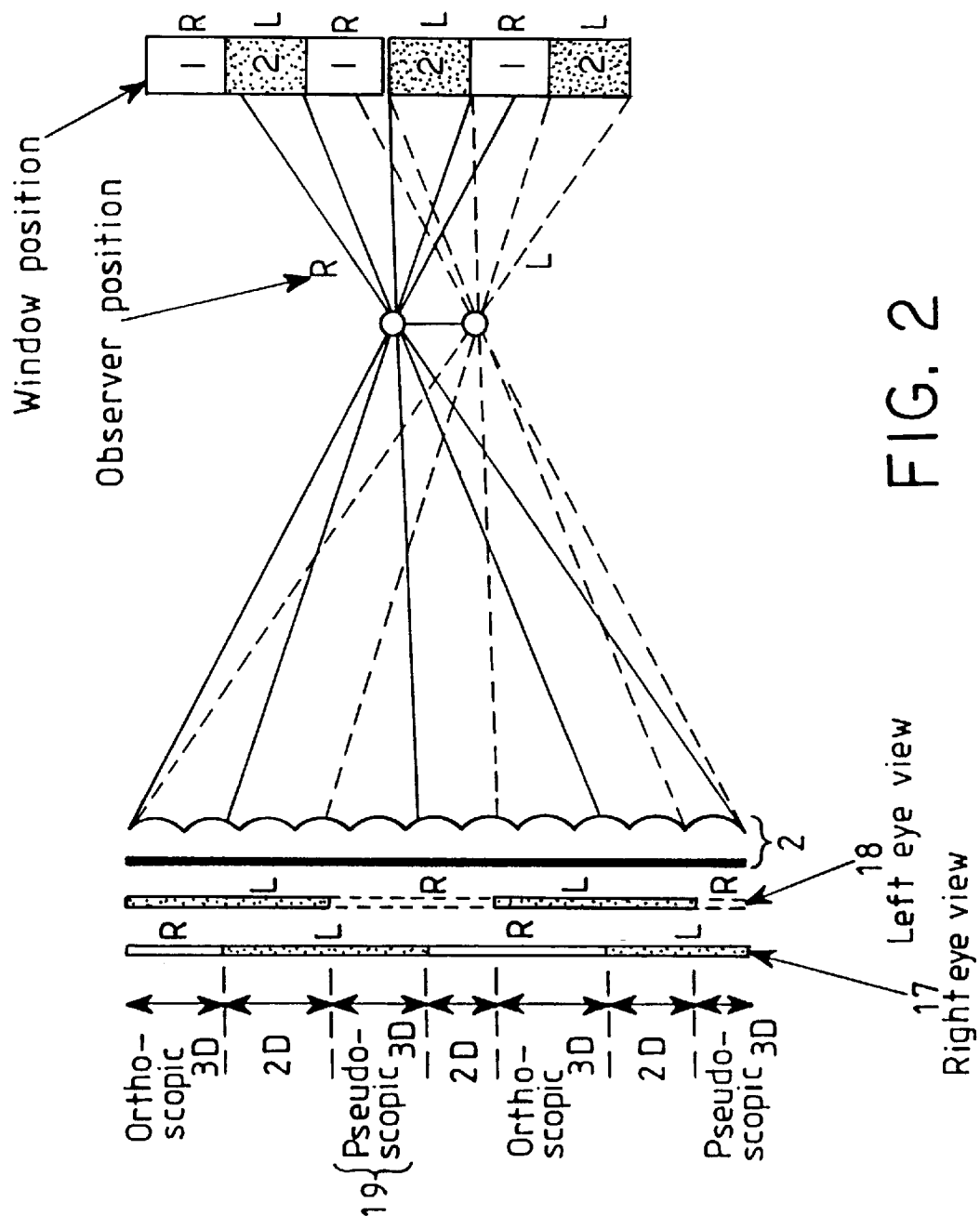
FIG. 2 schematically shows the limited freedom of movement for an observer viewing a two view multilobe autostereoscopic display.

As shown in FIG. 1, an autostereoscopic display emits (in plan view) cones of light along predetermined directions. Each cone of light represents part of a view from a given viewing position. Cones relating to the same view but emanating from different parts of the display can be arranged to converge at a viewpoint corrected zone by, for example, making the pitch of a lenticular screen within the display slightly less than the pitch of pixel groups within the display. The distance between the display 5 and the widest parts of the viewpoint corrected zones 12 and 14 corresponds to a design viewing distance for the display. The positions of the viewpoint corrected zones for the display of FIG. 1 are fixed in space with respect to the display and hence such a display has a limited viewing area where the three dimensional effect can be perceived. Lateral or longitudinal movement of an observer will result in loss of the stereoscopic image if either of the observer's eyes moves outside a viewpoint corrected zone or if both eyes move into the same viewpoint corrected zone.

Figure 3:
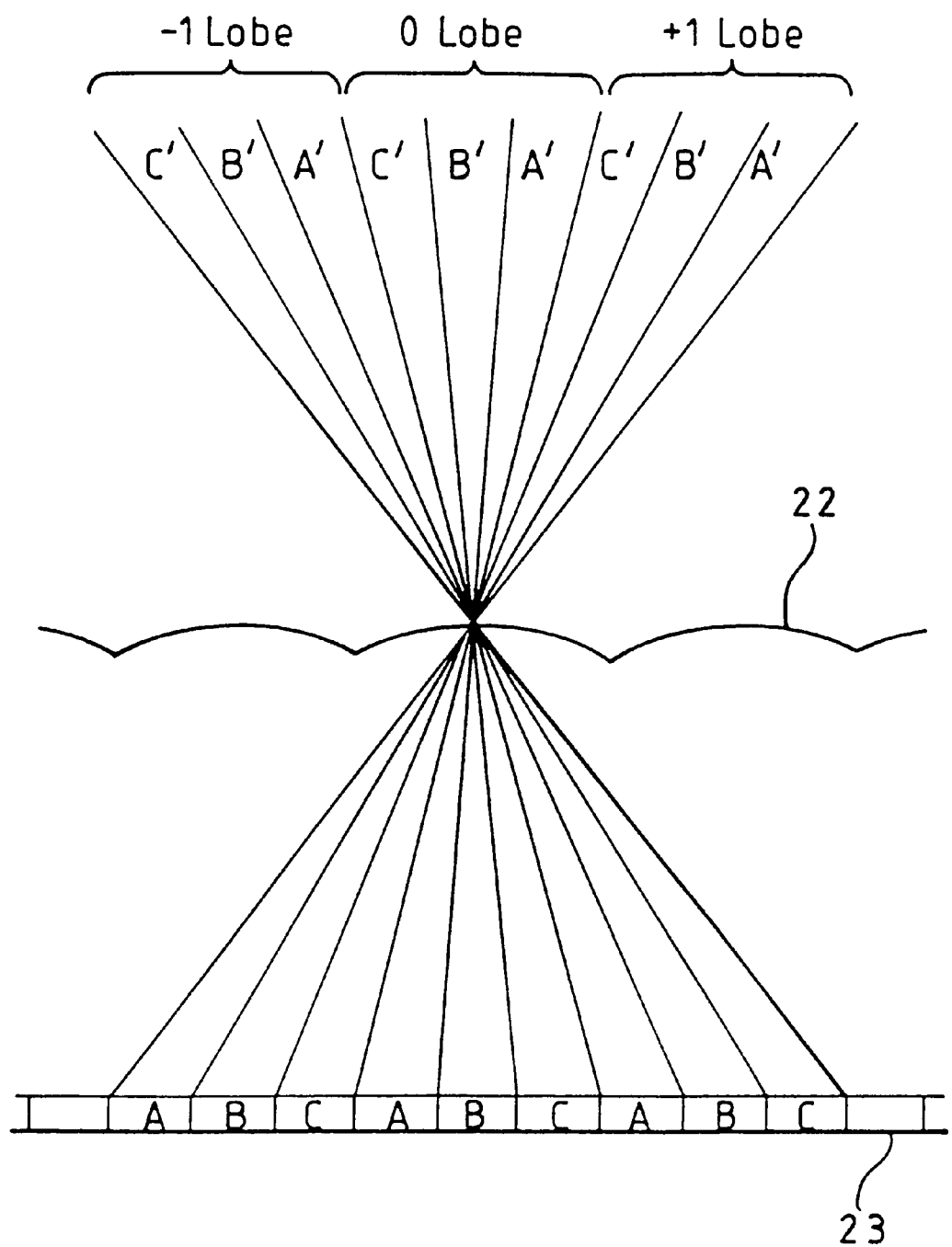
FIG. 3 schematically shows the generation of a three view, three lobe display by a single spatial light modulator and a lenticular array.

FIG. 3 schematically illustrates in plan view the generation of three views imaged into three lobes using a lenticular array 22 and a spatial light modulator 23. The spatial light modulator 23 is arranged to simultaneously display three images in a spatially multiplexed fashion—and hence acts as three different displays. The first display is composed of the pixels A, the second display is composed of the pixels B, and the third display is composed of the pixels C. The displays are interleaved so as to form a repeating pixel pattern ABCABC etc. The lenticular array 22 comprises a plurality of lenticules whose individual widths are substantially the same as the spatial extent of the three pixels ABC. Furthermore the centre of each lenticule is substantially aligned with its respective B pixel (this condition changes slightly for viewpoint corrected displays where the pitch of the lenticules is slightly less that the pattern repeat pitch ABC—but those lenticules towards the centre of the display are substantially aligned with the respective B pixels). The images from the pixels are imaged through the lenticules—as shown—to provide three lobes, labelled −1, 0 and +1, each of which comprises three images A', B' and C'. As described hereinabove with reference to FIG. 1, viewpoint correction results in the separate images combining within respective windows, labelled 1, 2 and 3 in FIG. 4.

Figure 4:
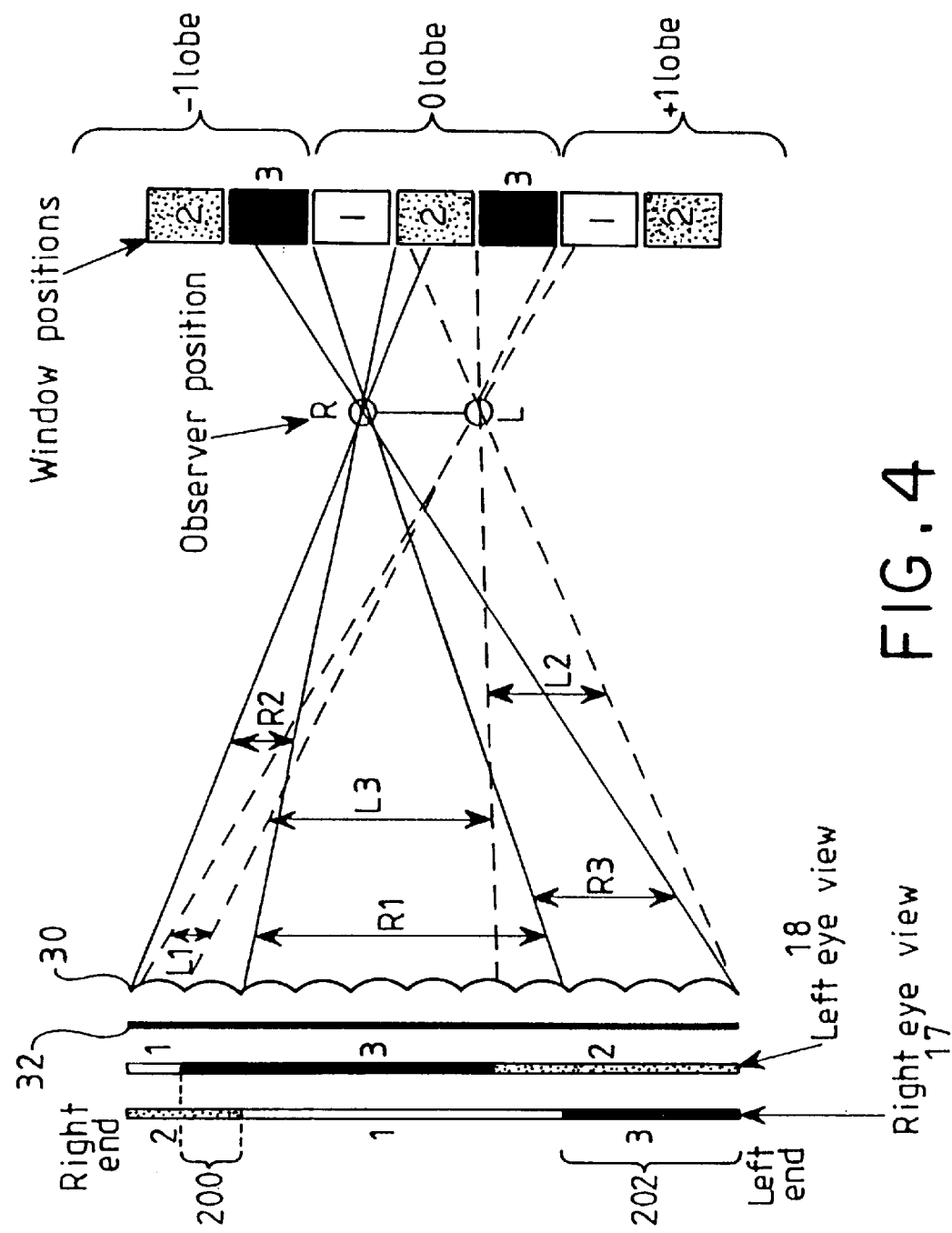
FIG. 4 is a schematic illustration showing the ray paths to an observer's eyes when the observer is positioned between a three window, multilobe autostereoscopic display and the design window positions for that display.

FIG. 4 schematically illustrates an autostereoscopic display comprising a lenticular screen 30 adjacent an image display device 32, such as a liquid crystal device spatial light modulator (arranged like elements 22 and 23 of FIG. 3). As before, image data is presented to the display device 32 so as to generate a number of output cones, each of which corresponds to a different view. Cones corresponding to the same view converge at a designed position so as to give viewpoint correction within viewpoint corrected zones at which the observer can observe the autostereoscopic effect. Each viewpoint corrected zone defines a "window" therein. Each "window" occurs at a predetermined distance from the display device. Movement of the observer towards or away from the display device results in each eye of the observer receiving views that were not intended for that eye. The display illustrated is arranged to produce an output having three lobes, labelled −1, 0 and 1, which each comprise three windows.

FIG. 4 also schematically shows the ray paths from the autostereoscopic display to an observer who is located nearer the display than the design position i.e. between the display and the "windows". The images seen by the observer can be calculated by tracing back the rays from the window boundaries (i.e. boundaries between adjacent viewpoint corrected zones) through each of the observer's eyes to the display. As shown, the right eye view will see the image in window 2 of lobe 0 at the right of the display, the image in window 1 of lobe 0 in the middle of the display and the image in window 3 of lobe −1 at the left of the display. The observer's left eye will see the image in window 1 of lobe 1 at the right hand end of the display, the image in window 3 of lobe 0 in the middle of the display and the image in window 2 of lobe 0 at the left of the display.

From consideration of the optical paths shown in FIG. 4, it is apparent that it is possible to present parts of two or more views to each display so as to compensate for movement of the observer out of the plane of the windows.

The observer does not see a view of the entirety of each one of the displays, i.e. pixel groups A, B and C of FIG. 3, when he moves away from the nominal viewing distance.

Each eye of the observer only sees images from distinct noncontiguous regions of each one of the displays when at the position shown in FIG. 4. This can be demonstrated by tracing the ray paths back from the boundaries of neighbouring windows through the observer's eyes to the display.

Considering the first display D1 (i.e. the A pixels of FIG. 3), this display generates the images projected to windows 1. The left eye only sees light propagating along the cone L1 from the first display, whereas the right eye only sees light propagating along the cone R1 from the first display. Consequently there are regions 200 and 202 of the first display that are not visible to either eye. Thus the region 204 (FIG. 5) of the first display D1 visible to the left eye is controlled to display a left eye view (illustrated by black shading), the region 206 visible to the right eye is controlled to show a right eye view (illustrated by no shading) and the first display is controlled to switch between left and right views at the centre of region 200. The region 202 is controlled so as to display the right eye view in a portion thereof adjacent the region 206.

Figure 5:
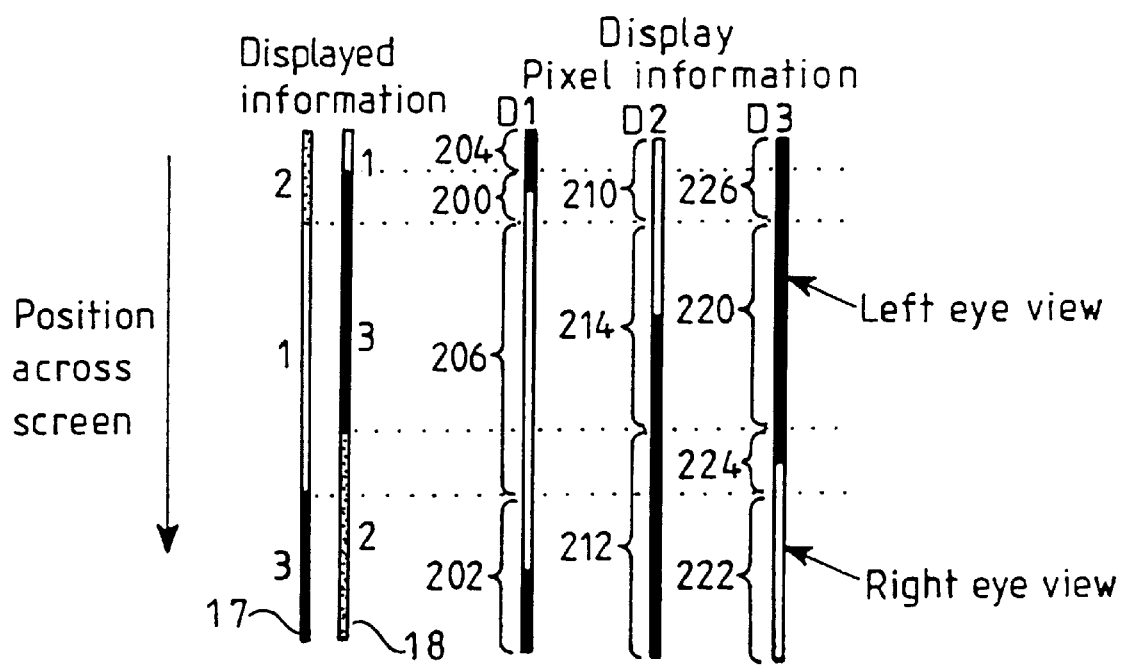
FIG. 5 is a schematic illustration of the image data which must be presented to the or each display device in order to maintain the autostereoscopic effect for the observer at the position shown in FIG. 4.

Similarly the second display D2 (i.e. the B pixels) projects an image into the windows 2. The right eye only sees light from the second display that propagates within the cone R2 corresponding to region 210 at the second display (FIG. 5). The left eye only sees light from the display propagating within the cone L2 corresponding to light emitted from region 212 of the second display. A central portion 214 of the second display is not visible to either eye. The region 210 is controlled to display a right eye view, the region 212 is controlled to display a left eye view and the region 214 is controlled such that the image displayed therein swaps between the left eye and right eye views at approximately the centre of that region, as shown in FIG. 5.

The third display D3 (i.e. the C pixels) projects an image into the windows 3. The left eye only sees light from the third display that propagates within the cone L3 corresponding to light from region 220 of the third display. The right eye only sees light propagating within the cone R3 corresponding to light from region 222 of the third display. Regions 224 and 226 of the third display are not visible to either eye. The third display is controlled such that a left eye view is displayed in regions 220 and 226, a right eye view is displayed in region 222, and region 224 has a transition between left and right views at the centre thereof.

Thus, the left eye only sees left views and the right eye only sees right views. Furthermore by controlling the regions 200, 214 and 224 to swap between views in the central portions thereof, the display is not affected by small errors in determining the observer's position and is less likely to be affected by aberrations in the optical system.

A similar analysis can be performed for other positions of the observer and for other display types, such as those shown in FIGS. 12 to 15.

Figure 6:
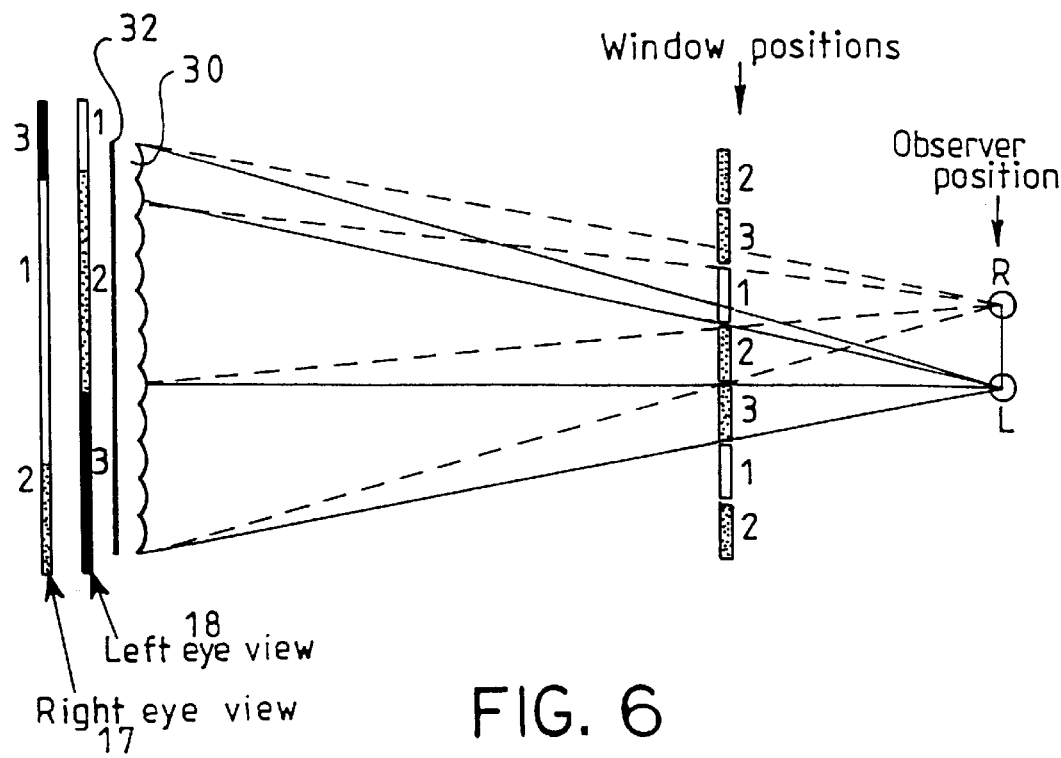
FIG. 6 is a schematic illustration showing the ray paths from the autostereoscopic display to the eyes of an observer who is located beyond the design position of the viewing windows.

FIG. 6 schematically illustrates the ray paths to an observer's eyes when the observer is located further away from the display device than the viewpoint corrected zones. As before, each of the observer's eyes receives views from more than one viewing window.

Figure 7:
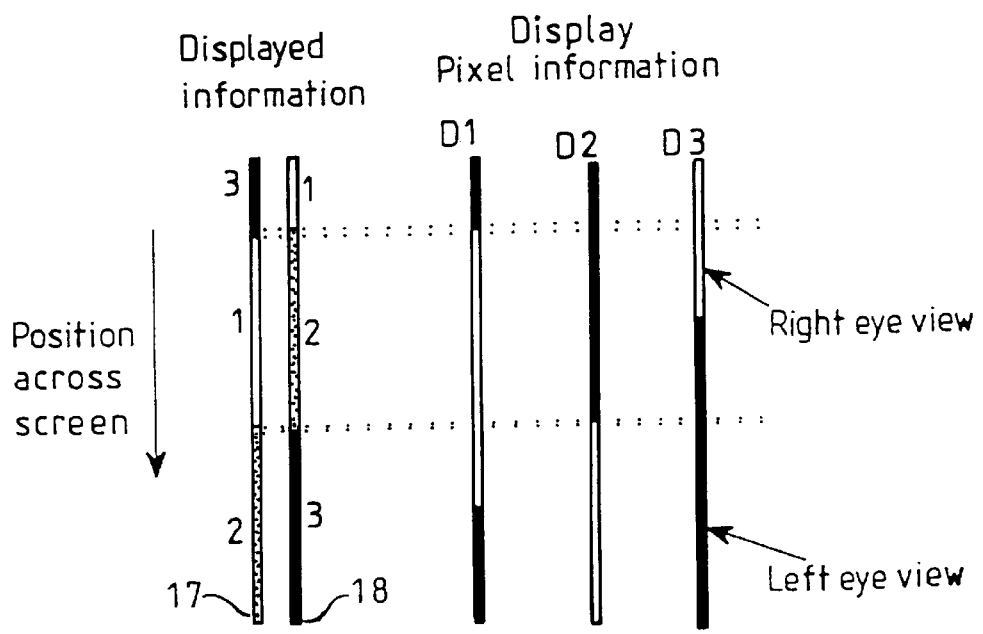
FIG. 7 is a schematic diagram showing the image data which must be presented to the or each image display device in order to maintain an autostereoscopic effect for the observer shown at the position in FIG. 6.

FIG. 7, which is similar to FIG. 5, schematically illustrates the mixture of view data to be presented to each display device in order to recreate the autostereoscopic effect.

Figure 8:
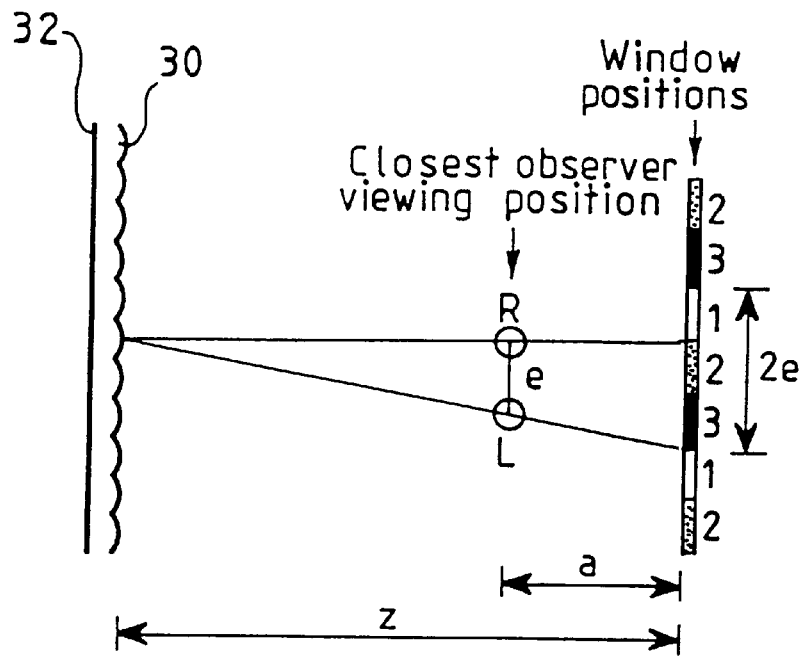
FIG. 8 is a diagram showing the ray paths from the display to an observer at the closest viewing position at which the autostereoscopic effect is visible.

FIG. 8 schematically illustrates the ray paths at the closest viewing position for a three view system in which each lobe at the window position has a lateral extent of twice the interocular distance e. As shown, the closest position occurs when the angle subtended by the observer's eyes to the display is equal to the angle subtended by two windows. In general, for a display having N windows at a distance z from the display, the maximum displacement a from the windows towards the display at which an autostereoscopic effect is still observed is given by:

$$a = \frac{z}{2}\left(\frac{(N-2)}{(N-1)}\right)$$

Figure 9:
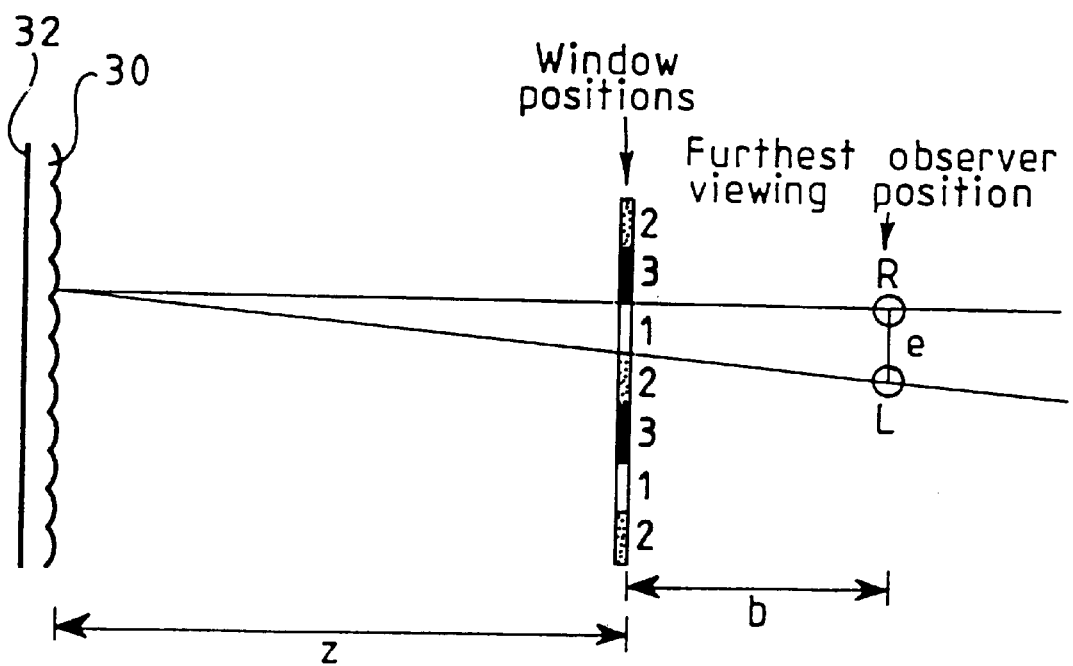
FIG. 9 a schematic diagram showing the ray paths from the autostereoscopic display to an observer at the furthest viewing position at which the autostereoscopic effect is visible.

FIG. 9 schematically illustrates the furthest viewing position for a three view system. The furthest viewing position is defined when the angle subtended from the display device to the observer's eyes is equal to the angle subtended by one window. In general, for an N window display, the maximum distance b beyond the window positions is given by:

$$b = \frac{z}{2}(N-2)$$

Lateral movement of the observer away from the axis of the display results in a small change in the maximum and minimum viewing distances due to the finite size of the display and aberrations within the optical components.

It is thus possible to longitudinally extend the range of viewing positions at which the autostereoscopic effect can be observed by updating the information displayed by each display device in accordance with the position of the observer.

Figure 10A:
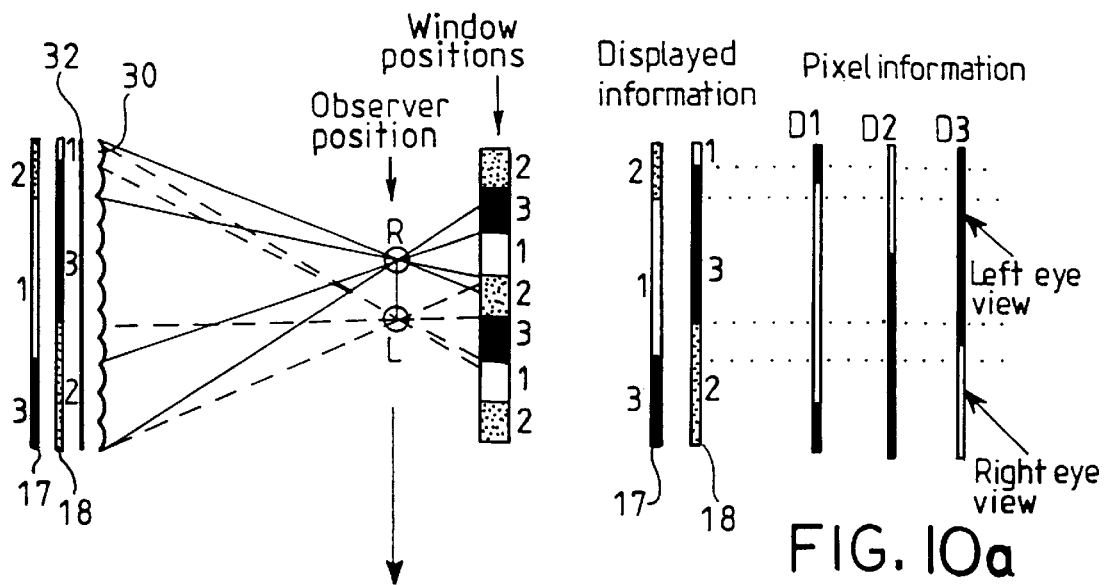
FIGS. 10a, 10b and 10c are schematic illustrations of the ray paths and 2D image data required to achieve an autostereoscopic effect at the observer positioned closer to the display than the design window distance and moving laterally.
Figure 10B:
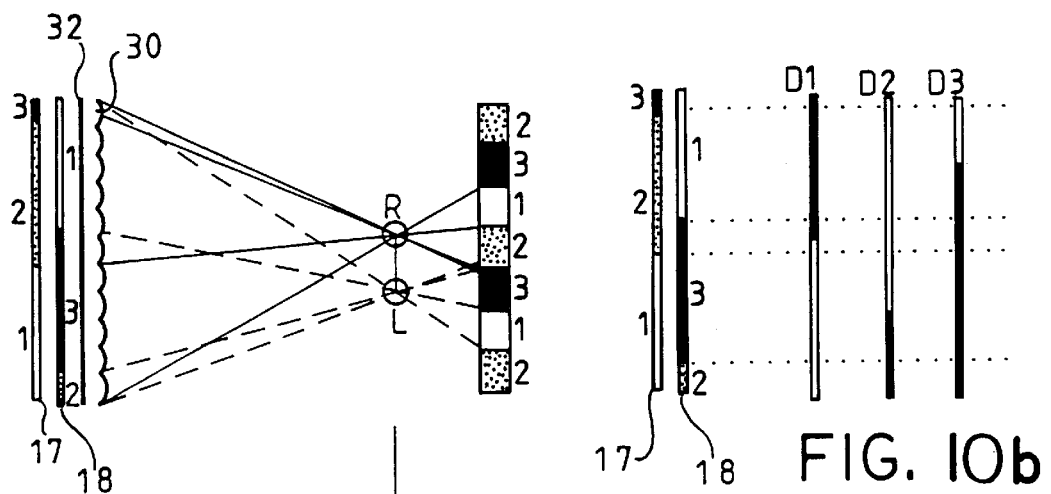
Figure 10C:
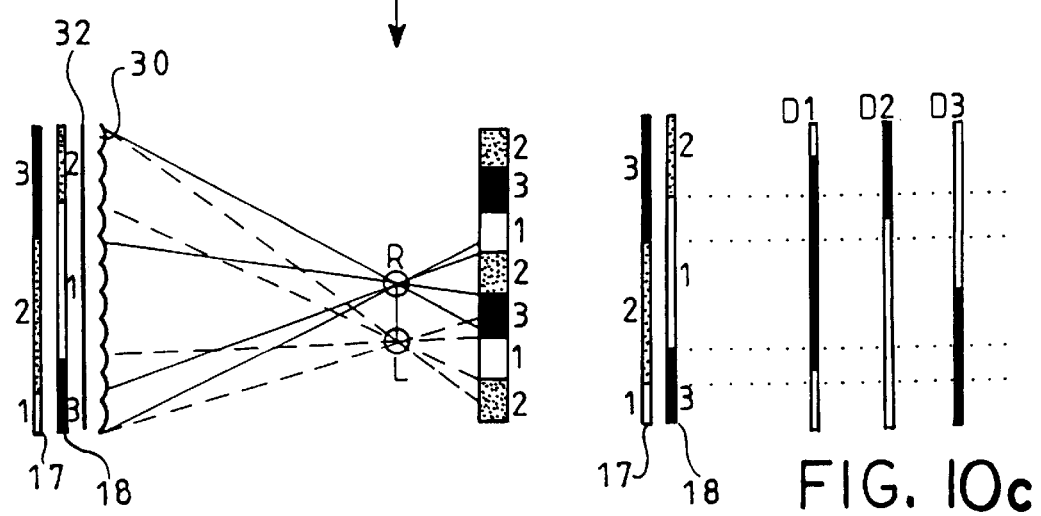

Lateral and longitudinal tracking may be performed simultaneously by the same display, as schematically illustrated in FIGS. 10a to 10c. FIGS. 10a to 10c are similar to FIGS. 4 and 5 in that they trace the ray paths back from the window positions through the positions of the observer's eyes to the display device for three positions of an observer which are laterally different but longitudinally the same. The figures also display the view information which must be supplied to the or each display device in order to maintain the autostereoscopic effect for the observer at each of his positions.

Figure 11A:
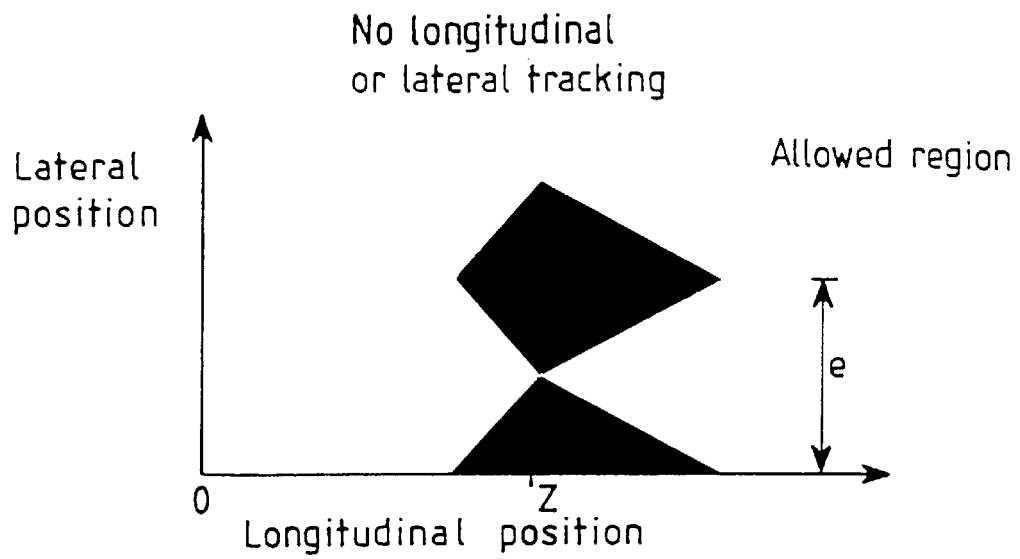
FIGS. 11a and 11b schematically illustrate the range of positions with respect to the display in which an observer will perceive the autostereoscopic effect.
Figure 11B:
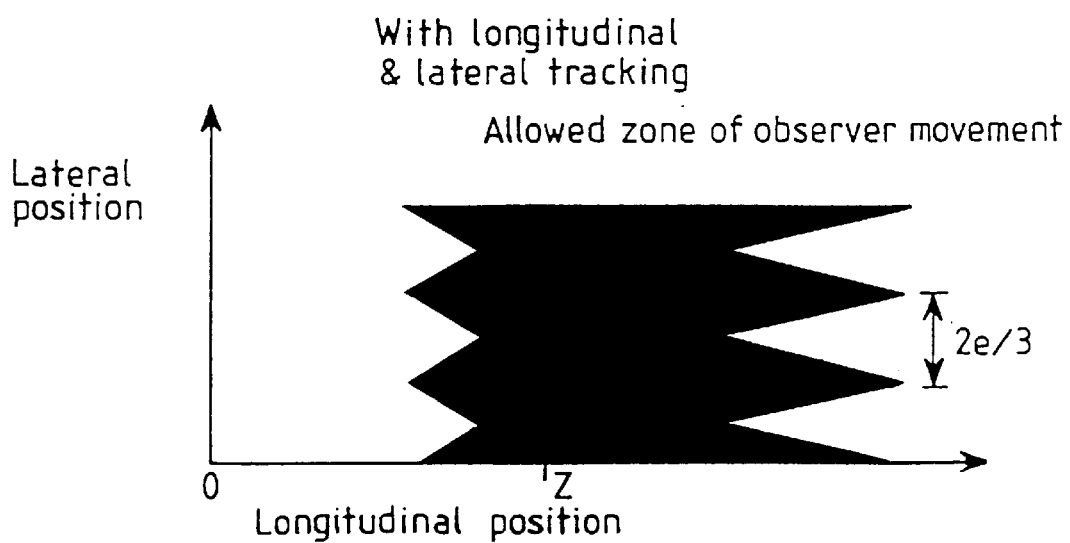

FIGS. 11a and 11b compare the spatial extent of the viewing regions at which the autostereoscopic effect can be observed. In each figure the position Z represents the nominal window position of a display not incorporating an embodiment of the present invention. FIG. 11a indicates the viewing position for a multilobe display not having observer tracking. FIG. 11b shows the observer positions for a multilobe display incorporating both longitudinal and lateral observer tracking. In each case, the ordinate represents the axis of display symmetry (i.e. mid-line of the display) and the shaded regions represent the area in which the autostereoscopic effect can be perceived.

For a three view display having a display size of 200 mm with a nominal observer distance of 1,000 mm, the minimum viewing distance is 750 mm and the maximum viewing distance is 1,500 mm. Thus the display has a total longitudinal freedom of 750 mm.

An equivalent four view system having tracking allows a minimum viewing distance of 670 mm and a maximum viewing distance of 2,000 mm. In each of the above examples, the interocular distance of an observer is assumed to be 65 mm.

The use of more views enables a larger longitudinal observer movement to be accommodated and also a wider range of interocular separations. Increased viewer freedom is generally obtained at the expense of lower display resolution and/or greater complexity.

Embodiments of the present invention make it possible to produce a large field for autostereoscopic viewing. The image content displayed to the observer may also be made to vary with respect to observer position so as to give a "look around" facility.

Methods of tracking the observer's position may include magnetic, infrared, ultrasonic and video tracking. Tracking systems are known per se and need not be described here in detail.

Such a display may also compensate for changes in the interocular distance between observers, such as between adults and young children.

Figure 12:
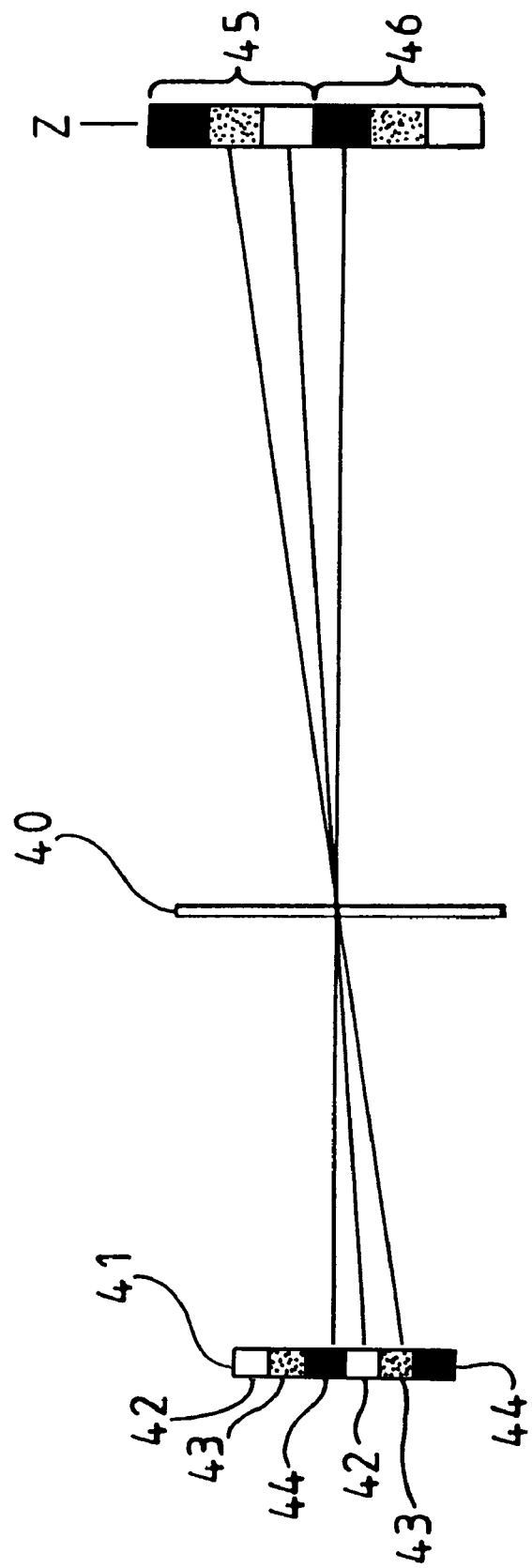
FIG. 12 is a schematic illustration of a time multiplexed display constituting an embodiment of the present invention.

FIG. 12 schematically illustrates an embodiment of the present invention. The display comprises a spatial light modulator 40, an illumination source 41 comprising six light emitting elements arranged in pairs 42, 43, and 44, and an imaging element such as a lens or parallax screen (not shown) for forming viewing windows corresponding to the light emitting elements. Each pair of light emitting elements has the same inter-element distance as each other pair and the elements are arranged in a common plane. The pairs of light emitting elements are illuminated in sequence. Video information is supplied to the spatial light modulator in a time multiplexed manner in sequence with the successive illumination of each pair of illuminators. Such a display provides two lobes 45 and 46 each having three windows at a nominal viewing position Z.

Figure 13:
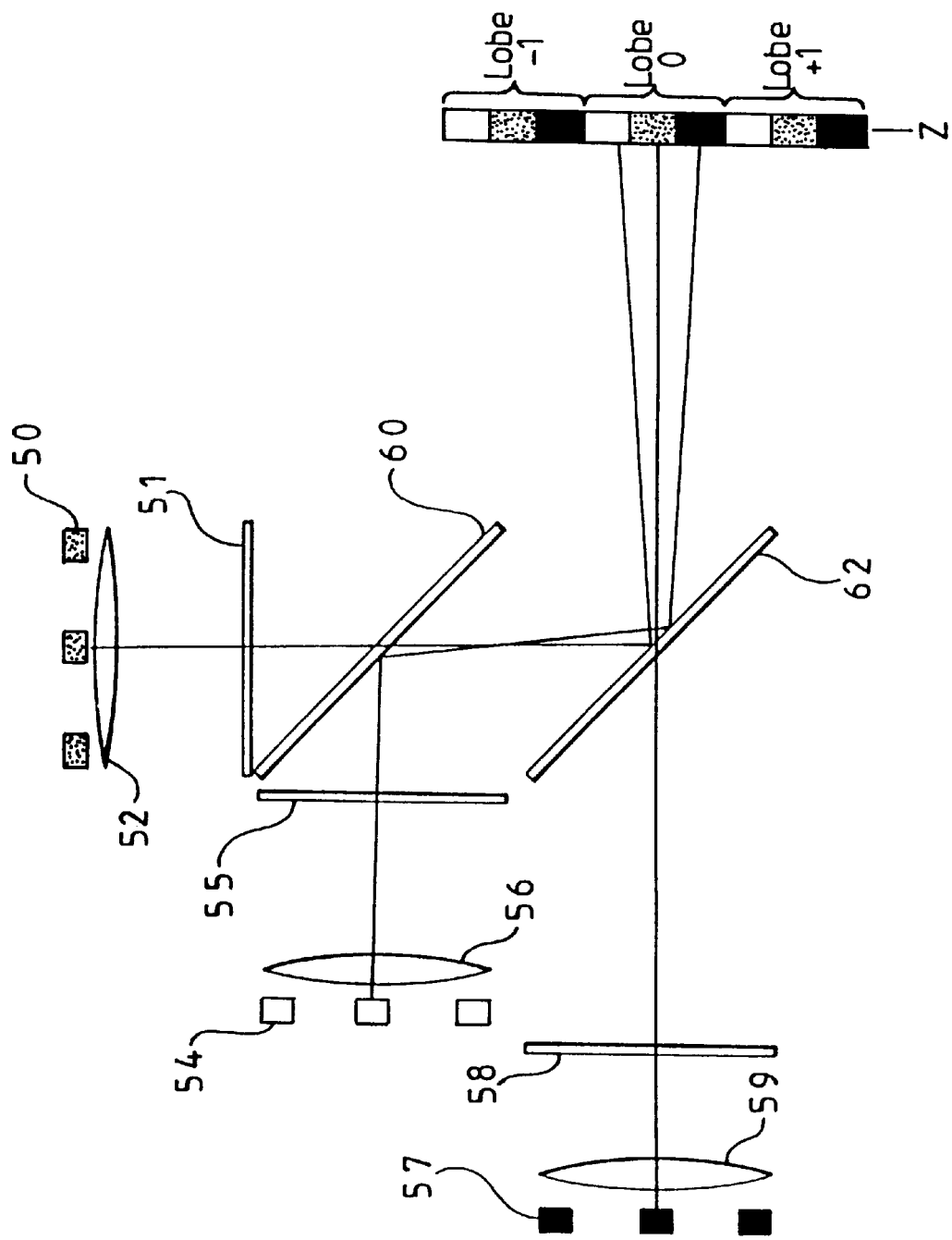
FIG. 13 is a schematic illustration of a three view beam combiner display constituting an embodiment of the present invention.

FIG. 13 illustrates a further embodiment of the invention. A first light source 50 comprises three regularly spaced illuminators and is arranged to illuminate a first spatial light modulator 51 via a lens 52. Similarly, a second light source 54 comprises three regularly spaced illuminators and is arranged to illuminate a second spatial light modulator 55 via a lens 56. Similarly, a third light source 57 comprises three regularly spaced illuminators and is arranged to illuminate a third spatial light modulator 58 via a lens 59. Each lens 52, 56 and 59 forms an image of it's respective light source at a nominal viewing position Z. A first beam combiner 60 combines the images of the first and second light sources 50 and 54, respectively, following modulation by their respective spatial light modulators. This combined image is further combined at a second beam combiner 62 with the image of the third light source 57 following modulation by the third spatial light modulator 58. The images are arranged to be laterally offset with respect to one another so as to provide an output of three lobes (labelled −1, 0 and +1) each comprising three windows. The windows form a substantially contiguous output at the nominal viewing position Z.

Figure 14:
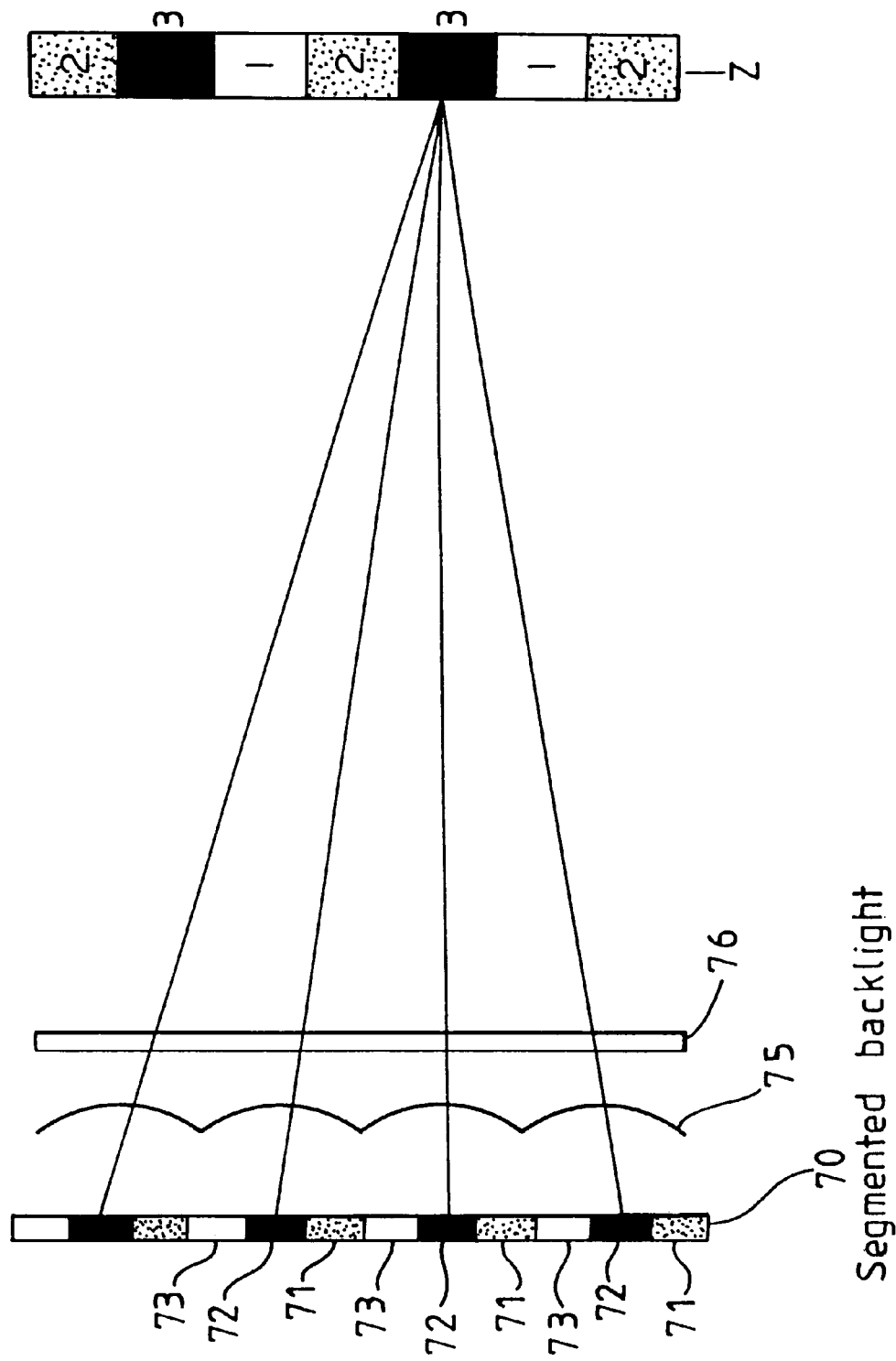
FIG. 14 is a schematic diagram of a time multiplexed display with compact illumination constituting an embodiment of the present invention.

FIG. 14 schematically illustrates a further embodiment of the present invention. A back light 70 comprises three groups of light emitting elements. Elements belonging to the first group are labelled 71, elements belonging to the second group are labelled 72 and elements belonging to the third group are labelled 73. The light emitting elements are arranged in a repeating sequence of an element from the first group, an element from the second group and an element from the third group. Light from the light emitting elements is collected by an array of lenses 75 and is directed towards a nominal observer viewing position Z via a spatial light modulator 76. Each group of light emitting elements is illuminated in turn and the spatial light modulator is driven in a time multiplexed manner so as to present a different view to each one of the viewing windows.

Figure 15:
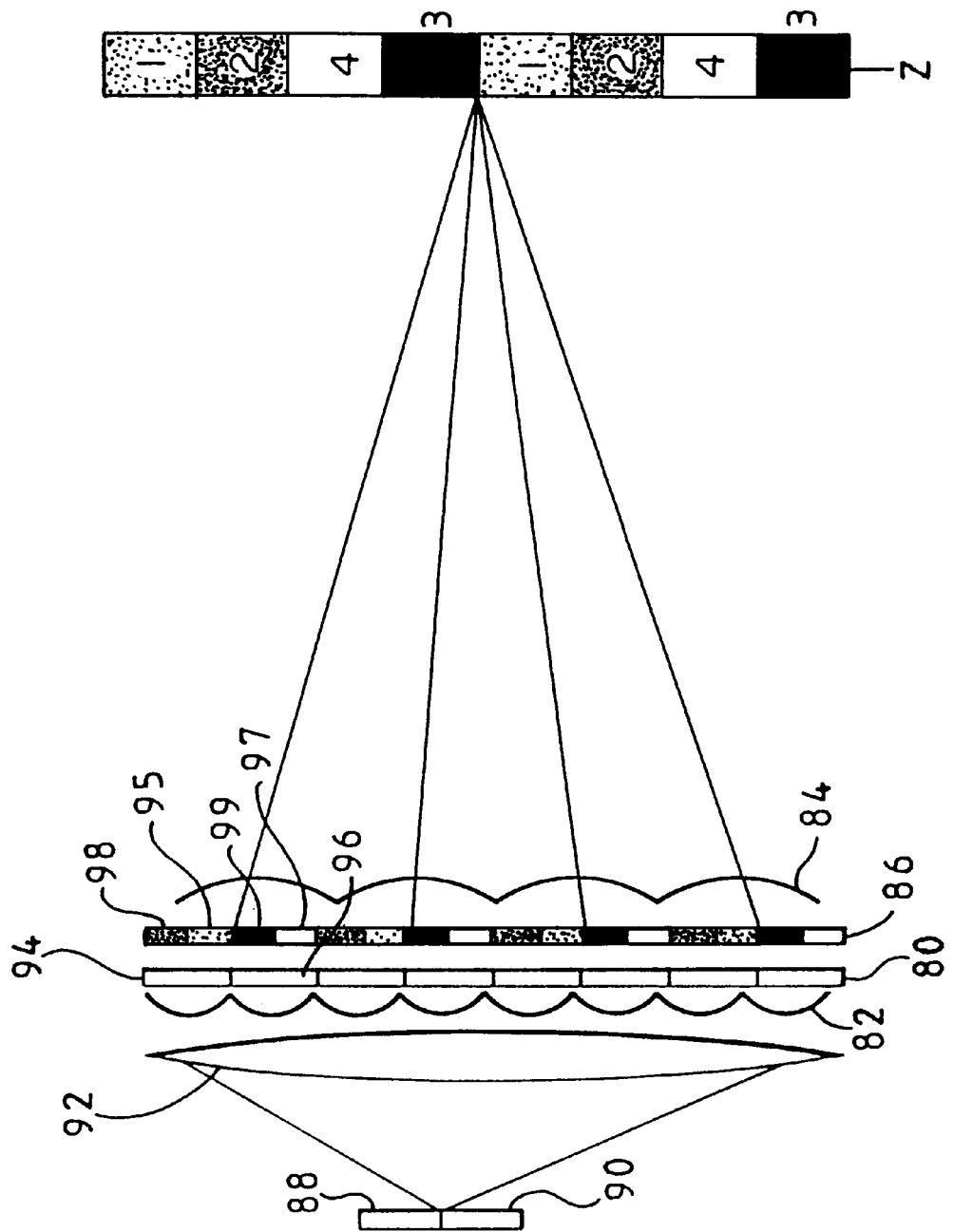
FIG. 15 is a schematic diagram illustrating a four view display constituting a further embodiment of the present invention.

FIG. 15 schematically illustrates a further embodiment of the present invention. A spatial light modulator 80 is sandwiched between first and second lenticular arrays 82 and 84. The first array 82 is adjacent the spatial light modulator 80 and has a pitch substantially equal to that of the spatial light modulator. The second lenticular array 84 has a pitch substantially twice that of the first lenticular array. A diffuser 86 is positioned intermediate the spatial light modulator 80 and the second lenticular screen 84. First and second light sources 88 and 90 are arranged to illuminate the first lenticular array 82 via a lens 92. The diffuser 86 is positioned such that an image of the light sources 88 and 90 is formed thereon following modulation by the spatial light modulator 80. The diffuser 86 also lies in an object plane of the second lenticular screen 84. The second lenticular screen 84 re-images the diffuser 86 at the nominal viewing position Z.

The light sources 88 and 90 and the spatial light modulator 80 are driven in a time multiplexed manner. When the first light source 88 is illuminated, a first modulating element 94 of the spatial light modulator 80 forms a modulated image at a position 95 on the diffuser 86 whereas a second element 96 of the spatial light modulator forms an image at a position 97 on the diffuser 86. These positions are re-imaged as elements of window views 1 and 4 of each lobe. When the first illuminator 88 is extinguished and the second illuminator 90 is illuminated, the same modulating elements 94 and 96 form images at positions 98 and 99 respectively on the diffuser 86. These images form elements of windows 2 and 3 in each lobe. Such an embodiment combines both spatial and temporal multiplexing to provide a multi-lobe four view display.

Figure 16:
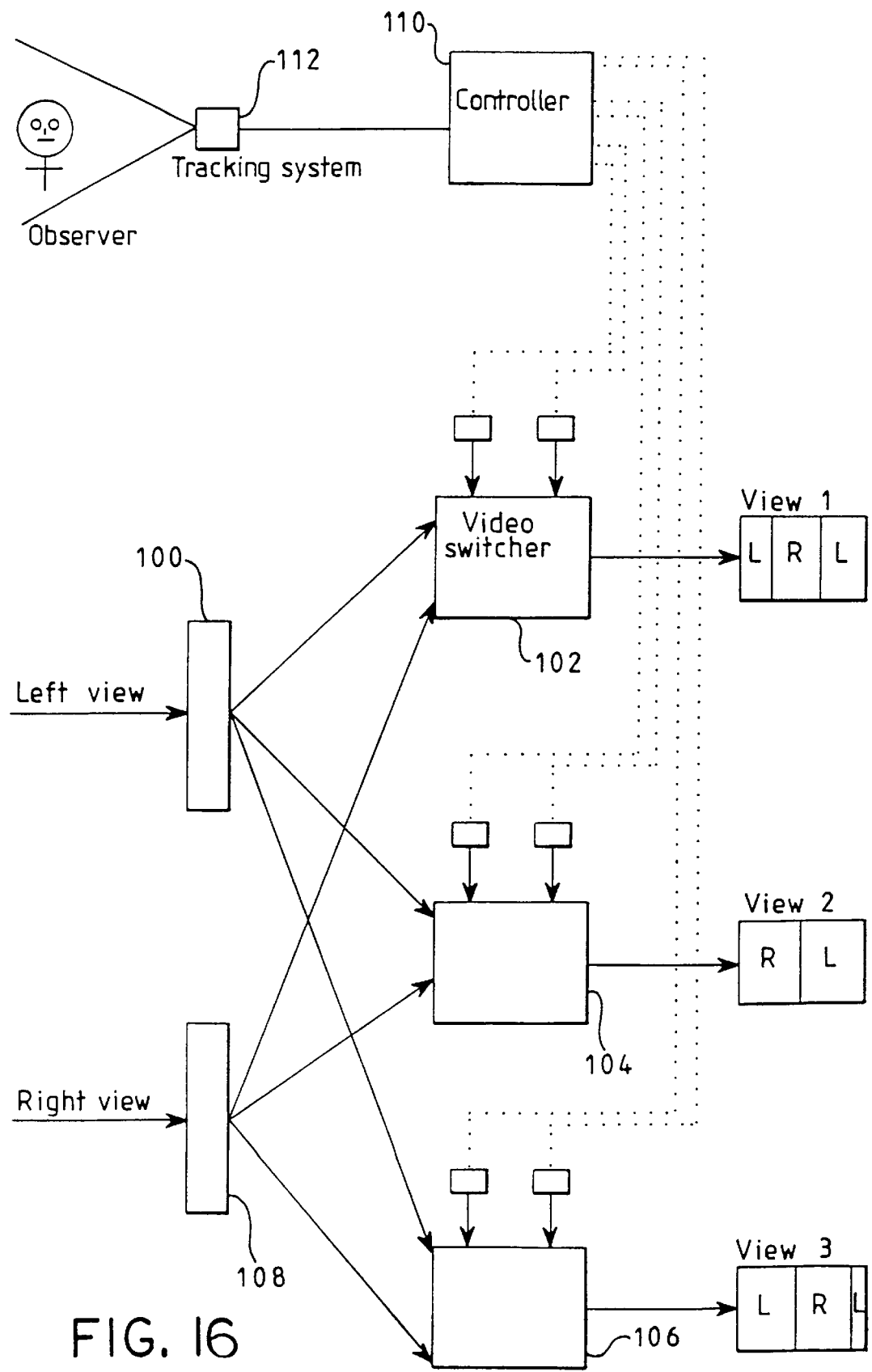
FIG. 16 schematically illustrates a multiplexing system for the production of sliced video images.

FIG. 16 schematically illustrates a video multiplexing system for the production of the sliced video images. Although three or four windows are provided, only left and right eye view information is required. Left eye view information is provided via a buffer 100 to left view inputs of first, second and third video switches 102, 104 and 106. Similarly right eye view information is provided via a buffer 108 to right eye inputs of the first, second and third video switches. Each video switcher is responsible for generating the video view to be provided to one of the display devices for generation of a view within one of the windows. Each video switcher may control a respective display device or may be arranged to drive a single display in a multiplexed fashion, for example as shown in FIG. 12. Each video switcher receives two control inputs from a controller 110 which selects whether the left view or right view should be displayed over a given part of the video output. The controller 110 is responsive to a tracking system 112 which determines the position of an observer. From a knowledge of the observer's position and the parameters of the display, the controller selects appropriate views and instructs the video switches to display the relevant parts of the left and right views.

The controller essentially performs the view analysis illustrated in FIGS. 4, 6, 8, 9 and 10*a* to 10*c*. The controller may comprise a look up table which contains data as to which of the left and right views should be selected by each video controller for a given observer position. The controller 110 may perform a simple interpolation to improve the degree of control or reduce the number of data points required in the look up table.

The positions at which the view information is switched can be measured by placing the observer's eyes so that pre-defined slices of images can be seen across the display. For example, referring to FIG. 4, display D1 is made red and display D2 is made blue. The observer moves until a red image is seen on the left hand side of the display and a blue image is seen on the right hand side with the right eye. The slice edges are then aligned to reference markers on the edge of the display by movement of the observer's right eye laterally and longitudinally. For this condition to be met, the observer's right eye must be at the above defined position in space, i.e. when the red image is seen on the left hand side of the display and the blue image is seen on the right hand side of the display. In this way, a set of calibration points can be derived which are used to define the switch positions in the display. In particular, the maximum extent of the viewing range can be determined so that the backlight is switched off when the observer falls outside an acceptable zone. In this way, it is possible to compensate for aberrations of the optical system.

Figure 17:
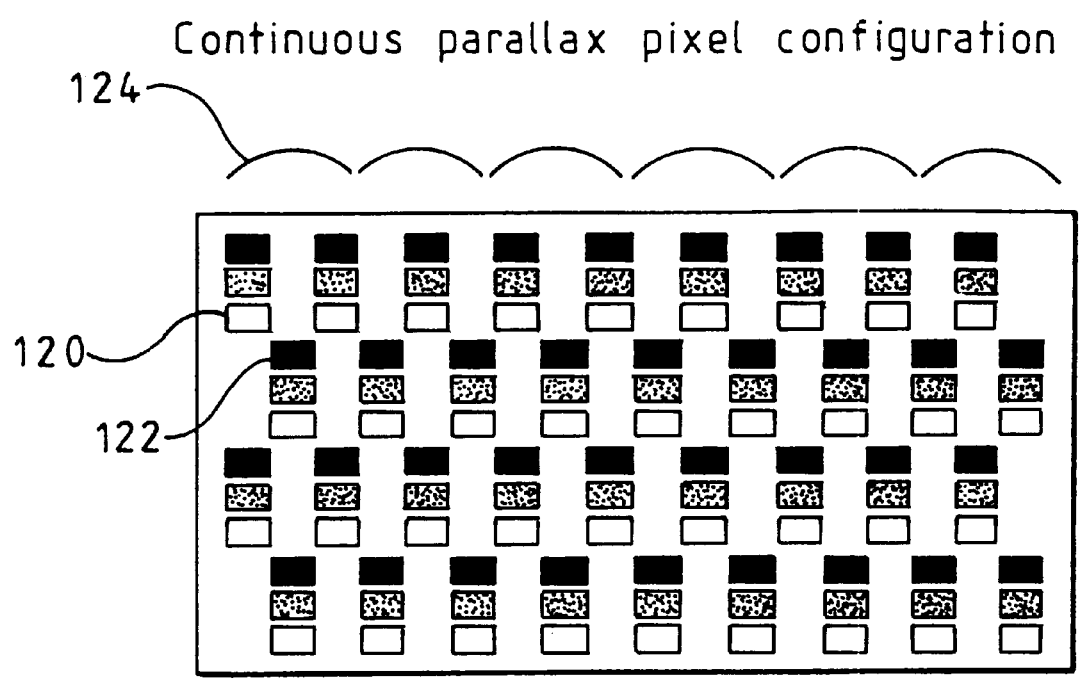
FIG. 17 schematically illustrates a pixel arrangement within an LCD screen for allowing the formation of contiguous image zones in lenticular displays.

For a display using a lenticular screen with a thin film transistor twisted nematic liquid crystal display, such as the display illustrated in FIG. 3, it is desirable that masked areas between individual pixels of the spatial light modulator should not be imaged as black bands. This problem can be overcome by using a pixel configuration of the type shown in FIG. 17. The arrangement of pixels as shown in FIG. 17 enables lateral gaps between the pixel group 120 and the pixel group 122 to be eliminated while still providing space for control lines within the display.

For a three window display, each lenticule 124 has a pitch substantially equal to that of three columns of pixels.

Figure 18:
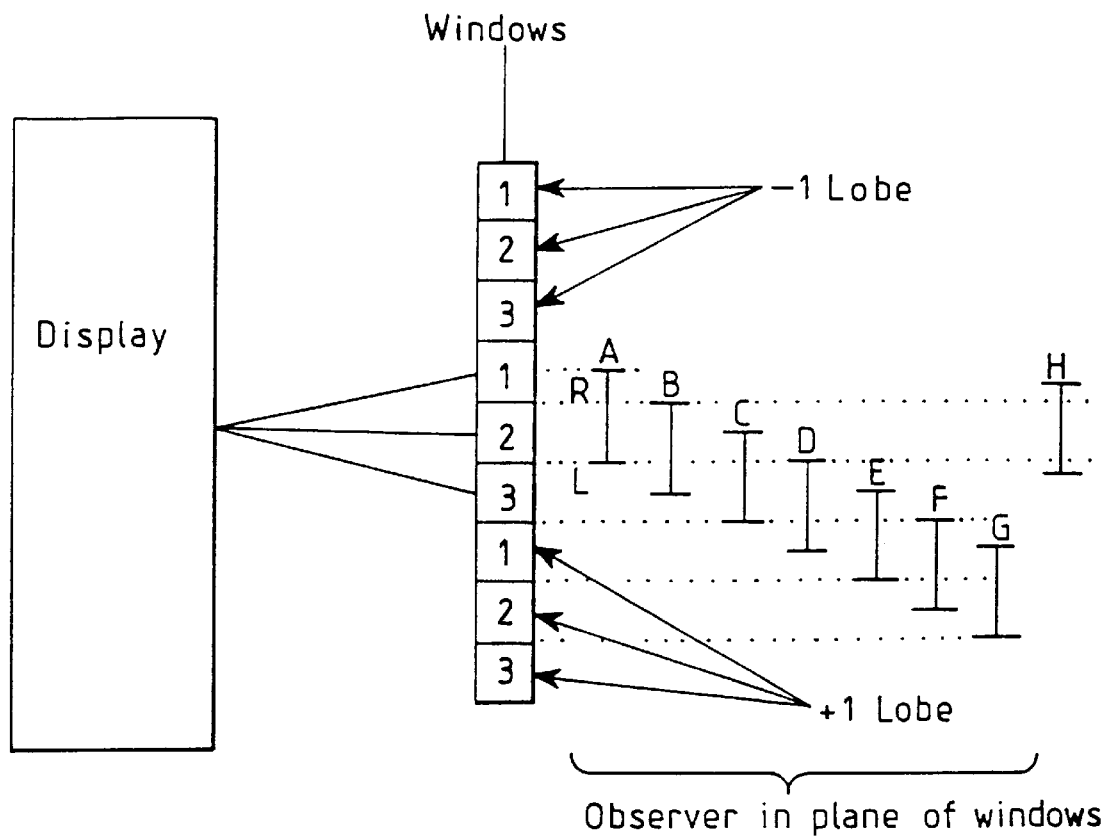
FIG. 18 schematically illustrates the operation of an embodiment of the present invention for an observer at the nominal viewing distance.

When the observer is positioned in the plane of the windows, as shown in FIG. 18, the displays are controlled such that they each display a complete left or right view. The display shown in FIG. 18 is a three view multilobe display such as described with reference to FIGS. 3, 12, 13 or 14. When the observer is at position A in FIG. 18, the observer's right eye sees the image in window 1 whereas the observer's left eye sees the images in windows 2 and 3. Thus the first display which is viewable in window 1 shows right view data whereas the second and third displays which are viewable from windows 2 and 3, respectively, show left view data. As the observer moves from position A to position B via position H, the second window 2 becomes unobserved and the image displayed therein can be updated to show right view data. Similar analysis for movement between the other positions shows that the image in a window need only be switched between left and right views when the observer is unable to view that window.

Figure 19:
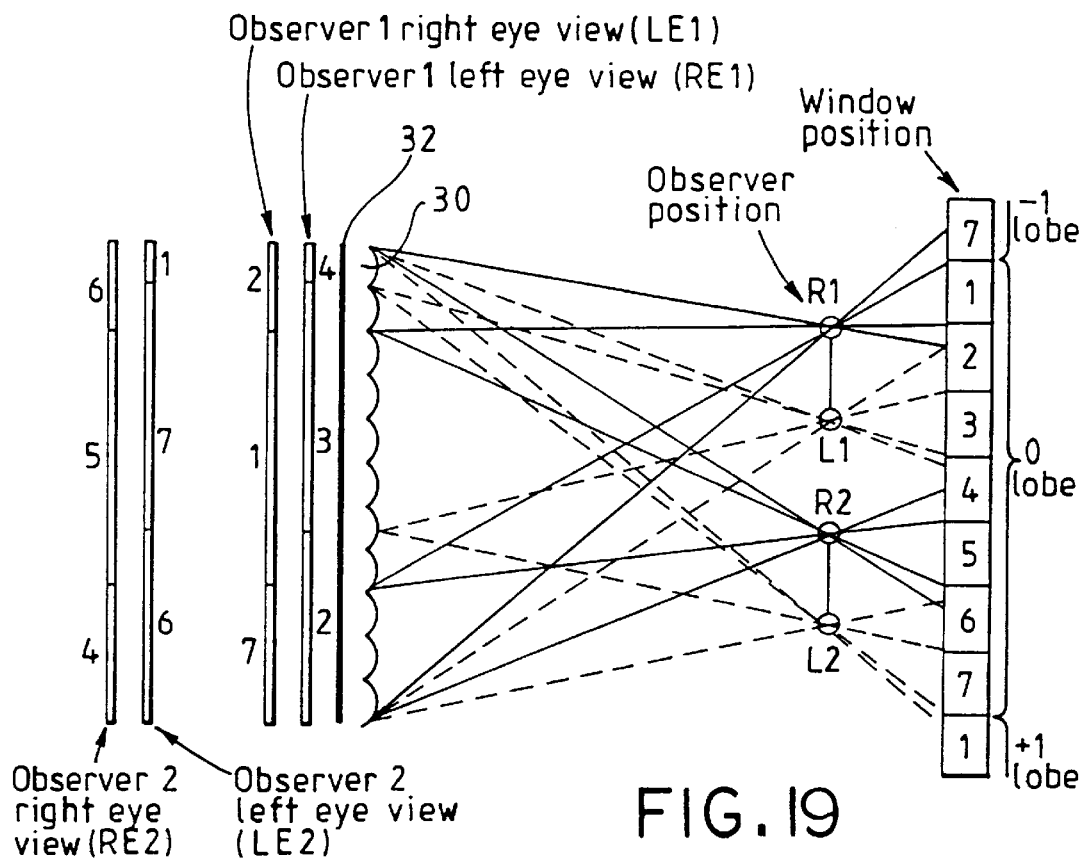
FIG. 19 is a schematic illustration showing the ray paths to two observers' eyes when the observers are positioned between a seven window multilobe autostereoscopic display and the design window positions for that display.

It is possible to provide autostereoscopic displays which are capable of tracking more than one observer. For instance, FIG. 19 shows a display of the type shown in FIG. 4 for tracking two observers. The display of FIG. 19 differs from that shown in FIG. 4 in that the LCD SLM 32 is arranged to provide seven views per lobe imaged at the window positions as shown. The SLM 32 thus operates as seven display devices D1 to D7 The ray paths for the two observers are shown and the views (labelled 1 to 7) which are visible to the right and left eyes of observers "1"and "2"across the display are illustrated by the vertical bars at the left in FIG. 19.

Spatially multiplexed displays which use three or four rather than two windows suffer from reduced resolution. This can be compensated for by spatially multiplexing a fast SLM device, for example a Pi Cell, to generate time multiplexed colour images in each of the views. The backlight is then switched between red, green and blue in synchronism with the SLM image. For a flat display, this may be achieved by using a backlight comprising three fluorescent tubes, the fluorescent tubes having a red phosphor, a green phosphor and a blue phosphor, respectively.

In this way, the benefits of increased viewer freedom obtained by electronic tracking methods may be maintained with an extended viewing freedom generated by view slicing together with a display resolution which is similar to a conventional 2D display.

Figure 20:
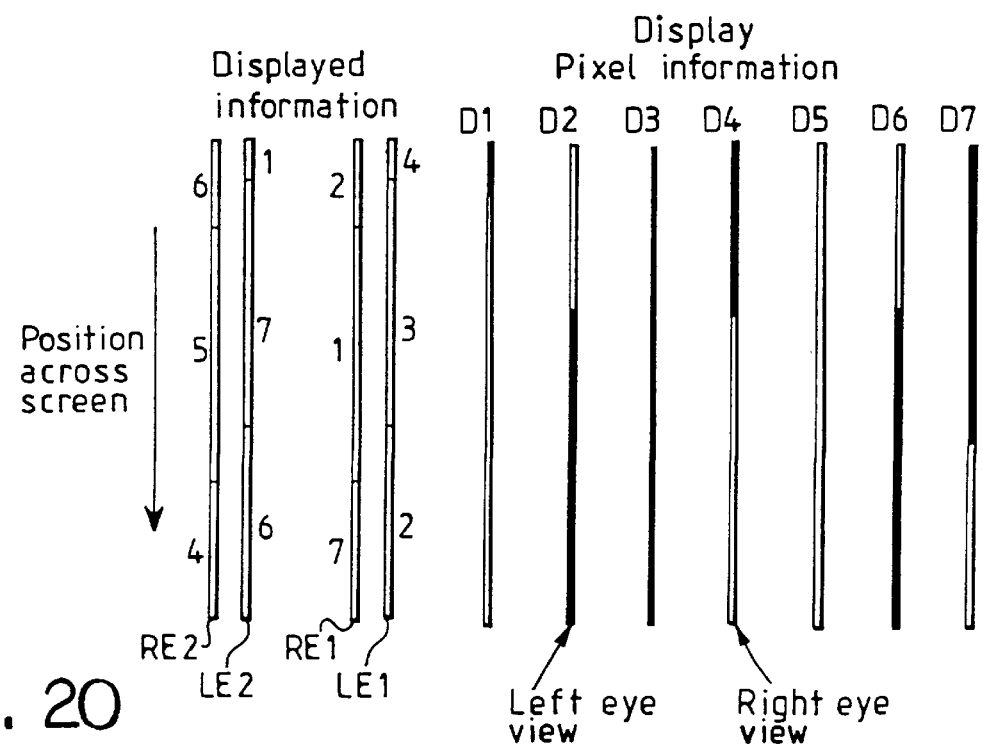
FIG. 20 is a schematic illustration of the image data which must be presented to the or each display device in order to maintain the autostereoscopic effect for the observers at the positions shown in FIG. 19.

FIG. 20 corresponds to FIG. 5 and illustrates the pixel information which each of the seven views provides across the SLM 32. Each of the views is split between left and right eye views as shown so that the left eyes L1 and L2 and the right eyes R1 and R2 of the observers see only left and right eye views, respectively, across the whole display, thus presenting correct autostereoscopic 3D images to both observers.

Other types of autostereoscopic displays, such as those shown in FIGS. 12 to 15, may be arranged to track more than one observer. The tracking system is required to track each observer independently and the display must be arranged to provide at least three views per observer to permit view slicing so that each observer sees a correct 3D image within an extended viewing region.

The above discussions have assumed have the optical elements were perfect. Aberrations within optical elements can distort the size and position of the windows. However, these effects can be compensated for from knowledge of the actual properties of the optical system—either by calculation or from mapping the window positions.

Figure 21:
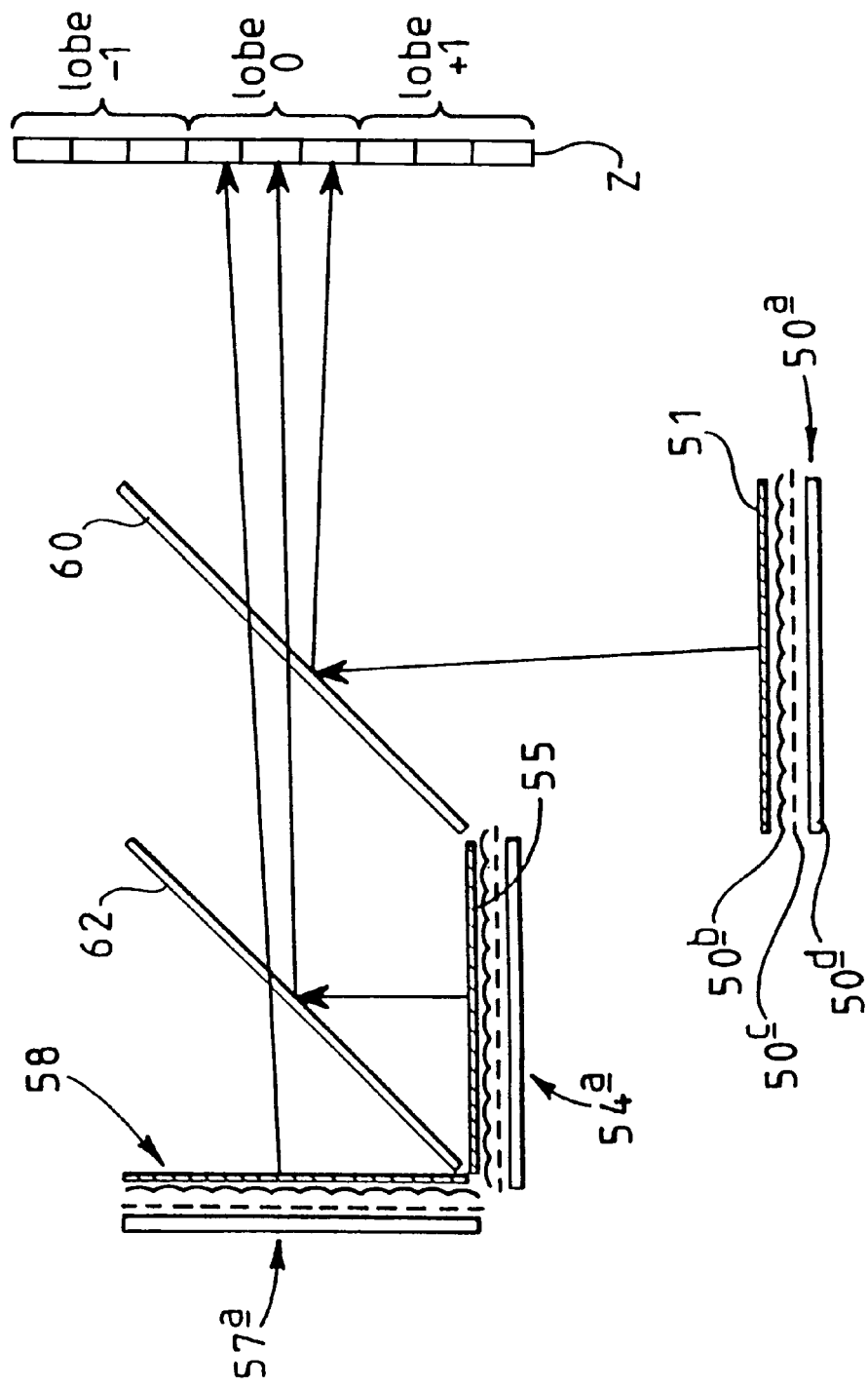
FIG. 21 is a schematic illustration of another three view beam combiner display constituting an embodiment of the invention.

The display shown in FIG. 21 differs from that shown in FIG. 13 in that the light sources 50, 54, and 57 and the lenses 52, 56, and 59 are replaced by compact illuminators 50*a*, 54*a*, and 57*a*. The compact illuminator 50*a* comprises a lenticular screen 50*b* behind which is disposed a parallax barrier 50*c*. The parallax barrier 50*c* comprises a plurality of slits, each of which is aligned with a lenticule of the lenticular screen 50*b*. A Lambertian backlight 50*d* is disposed behind the parallax barrier 50*c*. The compact illuminators 54*a* and 57*a* are identical to the compact illuminator 50*a*.

Each lenticule of the lenticular screen 50*b* images the aligned slit of the parallax barrier 50*c* to the window of the zero lobe. In addition, the adjacent lenticules image the same slit to the same windows in the −1 and +1 lobes of the viewing windows. Accordingly, the display shown in FIG. 21 operates in the same way as that shown in FIG. 13 but can be made more compact.

Figure 22:
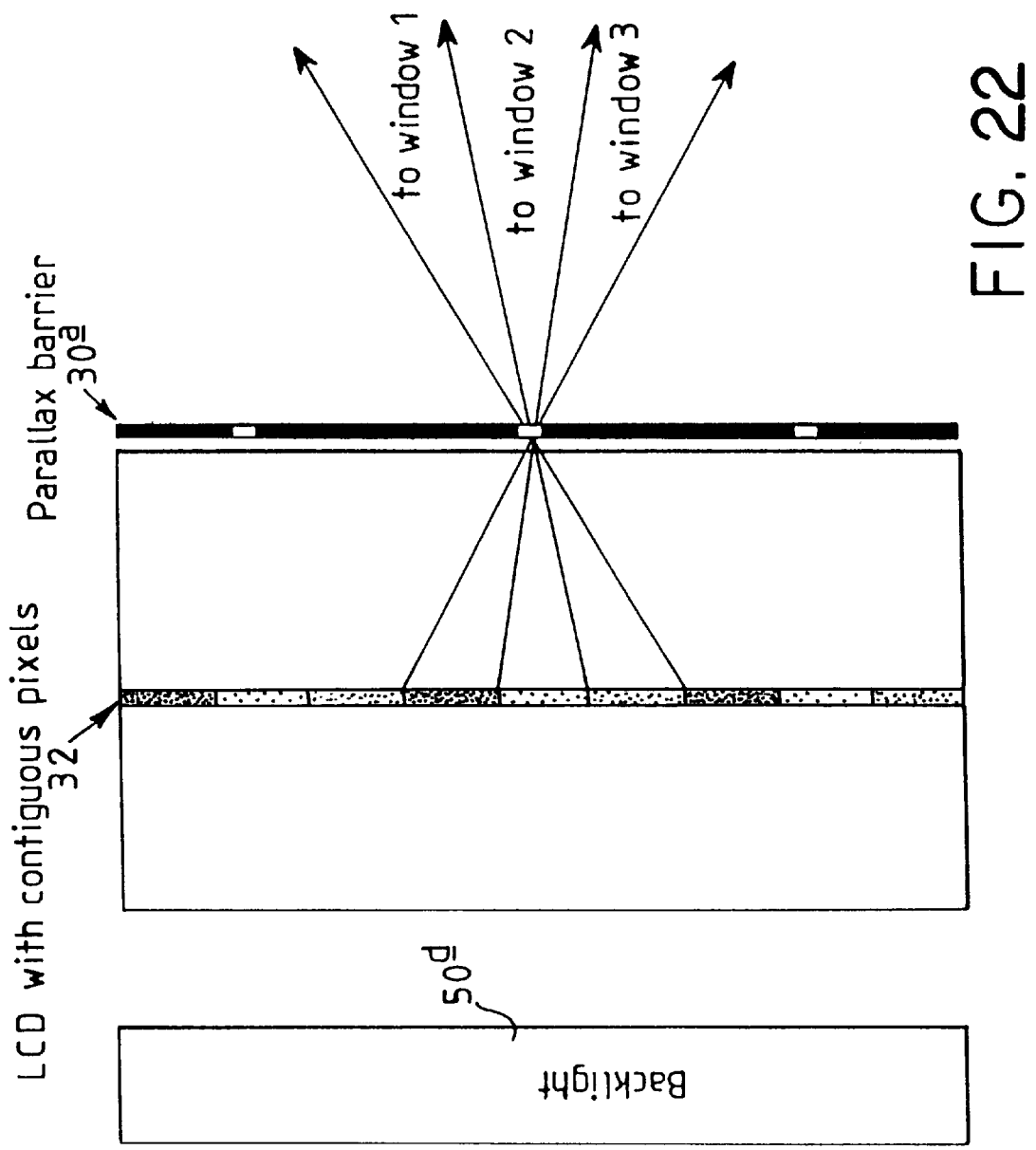
FIG. 22 is a schematic sectional view of part of a display using a front parallax barrier.

FIG. 22 shows part of a display which differs from that shown in FIG. 4 in that the lenticular screen 30 is replaced by a parallax barrier 30*a*. The barrier 30*a* comprises a plurality of slits aligned with the pixels of the liquid crystal display 32 as shown in FIG. 22. A Lambertian backlight 50d is provided behind the liquid crystal display, whose pixels are contiguous with each other.

As shown in FIG. 22, each slit directs light along light cones to the first, second, and third windows of the zero lobe from the associated pixels. Further, the slits form +1 and −1 lobe windows such that the windows in each lobe are contiguous with each other and the lobes are contiguous with each other.

Although displays of the type shown in FIG. 22 having a "front" parallax barrier 30a produce a darker image, for a given level of illumination, compared with displays using lenticular screens, parallax barriers do not suffer from the optical aberrations of lenticular screens. In a front parallax barrier display, the quality of the windows, particularly in terms of the width of the boundary of each window, produced at the plane of an observer is controlled by the width of the slits. If the slits are made narrower, the geometric spreading of each window edge is reduced. However, the amount of diffraction occurring at the slit increases with decreasing width of each slit so that it is necessary to choose the width of the slits as a compromise between diffraction and geometric degradation effects.

Figure 23:
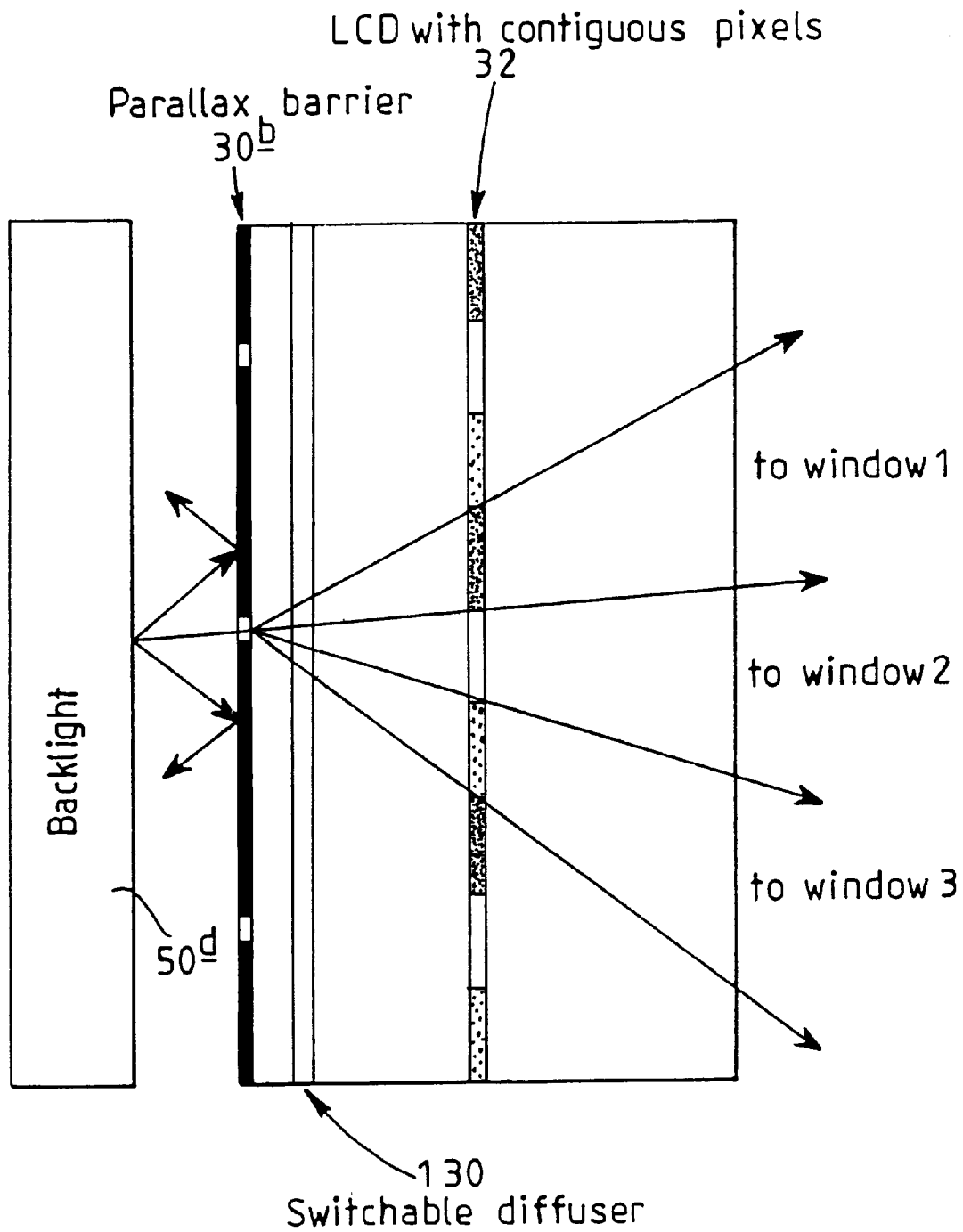
FIG. 23 is a schematic sectional view of part of a display using a rear parallax barrier.

FIG. 23 illustrates part of a display which differs from that shown in FIG. 22 in that the front parallax barrier 30a is replaced by a rear parallax barrier 30b disposed between the liquid crystal display 32 and the backlight 50d. A switchable diffuser 130 is provided between the barrier 30b and the display 32. The surface of the barrier 30b facing the backlight 50d is made reflective so that light which does not pass through the slits of the barrier 30b is reflected back to the backlight 50d for reuse. This improves the brightness of the displayed image.

The use of a rear parallax barrier 30b results in the geometric spreading of each window edge being controlled by the width of the slits of the parallax barrier whereas the diffraction spreading of the edges is controlled by the width of the pixels of the display 32. It is therefore possible to improve the quality of the window imaging compared with the display shown in FIG. 22 using the front parallax barrier.

The display may be used for two dimensional (2D) operation by switching the switchable diffuser 130 so as to diffuse light from the slits of the barrier 30b. The liquid crystal display 32 is then illuminated by a Lambertian source and 2D images are visible throughout a wide viewing range.

The rear parallax barrier 30b may be made as an array of transparent slits in an opaque mask. Alternatively, the barrier may be made by imaging a defined size light source through a lenticular screen on to a diffuser.

Figure 24:
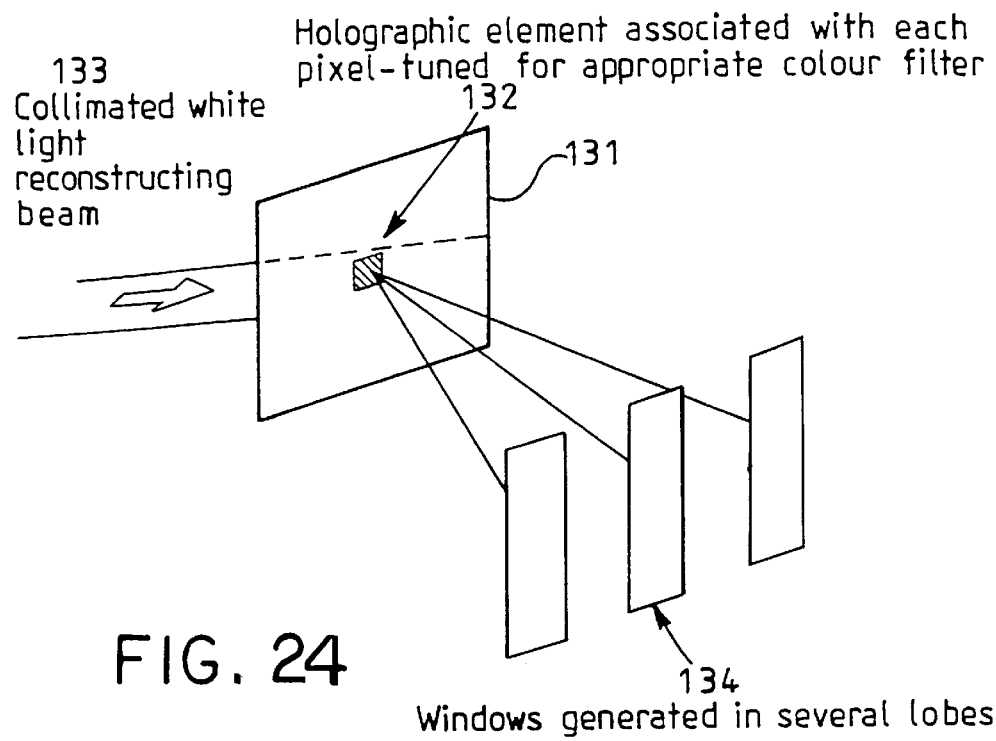
FIGS. 24 and 25 illustrate diagrammatically the use of holograms to form viewing windows.
Figure 25:
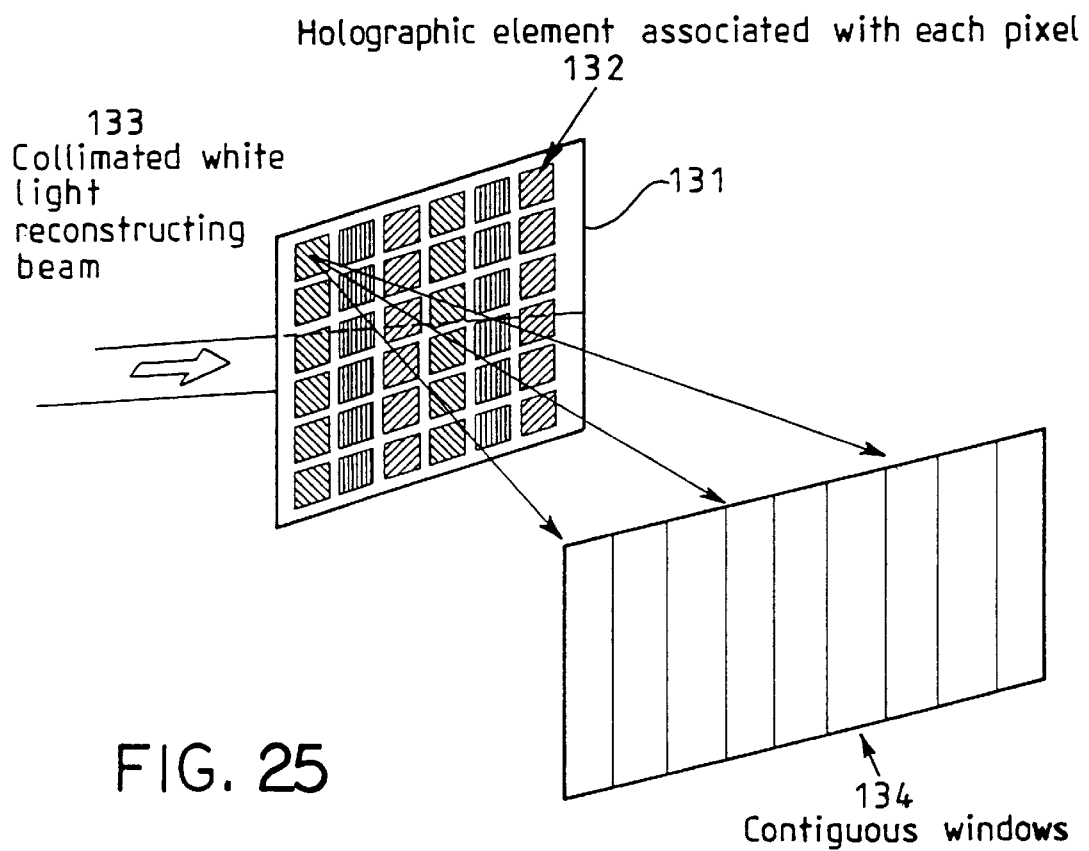

FIG. 24 illustrates diagrammatically an alternative technique for producing three or more contiguous windows by means of a hologram 131 comprising a plurality of holographic elements 132 associated with respective pixels of the spatial light modulator of the display and tuned for the appropriate colour filters of the pixels. Such holographic elements 132 are equivalent in operation to a lenticular screen or parallax barrier and, when appropriately illuminated for instance by a collimated white light reconstructing beam 133, each holographic element 132 produces a defined window for the associated colour. Each holographic element may be recorded so as to define several lobes as shown in FIG. 24. The holographic elements 132 are arranged in groups so that the light from each group of pixels is imaged to one of the three or more groups of windows as shown in FIG. 25. The intensity of the light is controlled by the pixel switching properties and the directionality by the hologram 131. An advantage of using holograms is that they are capable of providing significant improvements to the off-axis behaviour of the display because off-axis aberrations can be substantially cancelled when recording the holograms.

Figure 26:
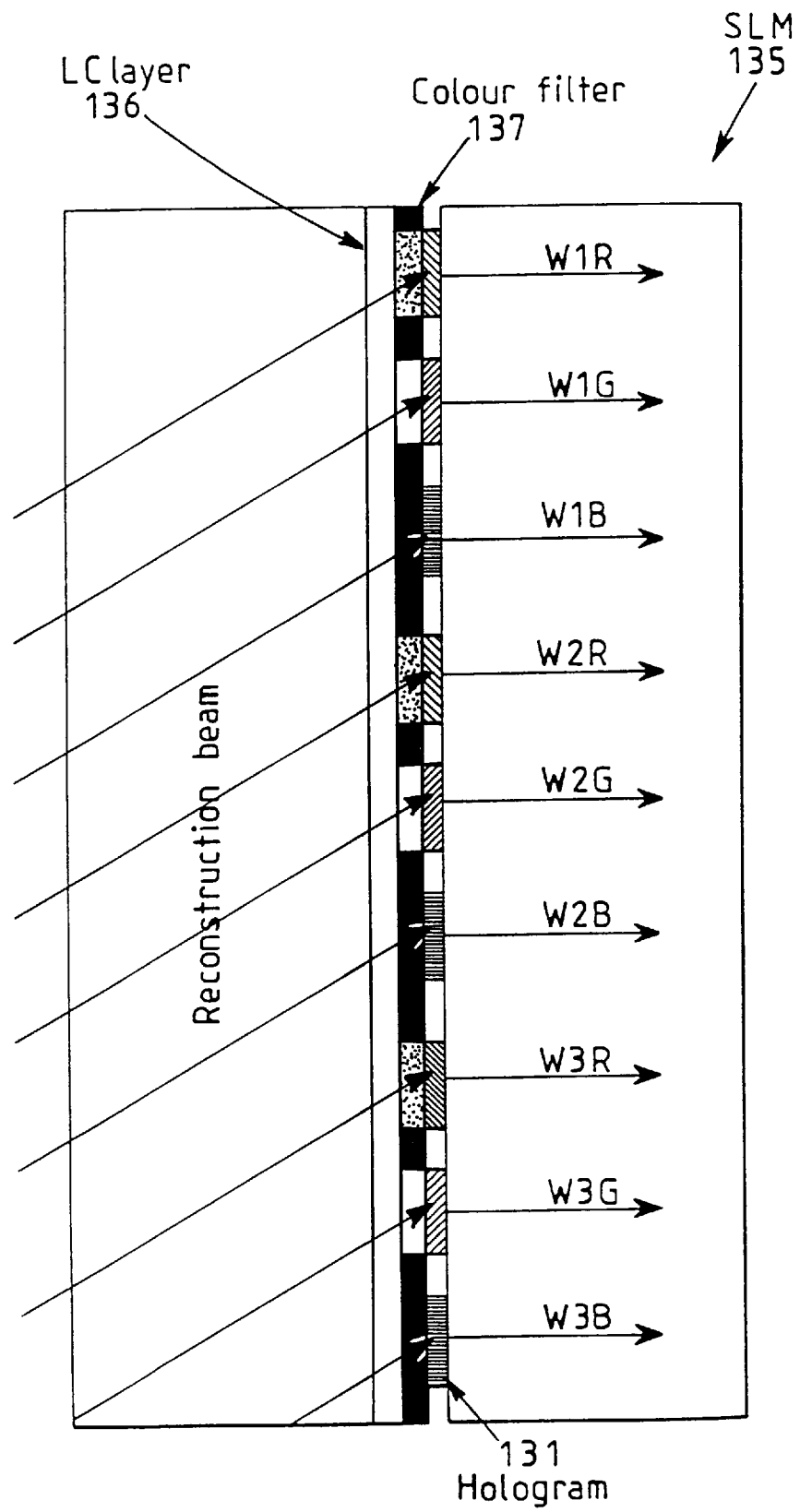
FIG. 26 is a schematic sectional view of part of a display using an internal hologram.

As shown in FIG. 26, the hologram 131 may be disposed inside a spatial light modulator 135 together with a liquid crystal layer 136 and a colour filter 137. Thus, the hologram is disposed substantially at the plane of the liquid crystal device forming the SLM135, for instance by controlling the pattern of a black mask inside the pixel aperture. The hologram at each pixel can be tuned so as to direct light for the particular colour associated with the colour filter for that pixel to the appropriate window. This is indicated in FIG. 26 by abbreviations such that "W" refers to a window and "R", "G", and "B" refer to red, green, and blue light, respectively. Thus, the while light performance of the display may be improved. For instance, a light source for the display may contain three narrow spectral peaks which may be obtained by the appropriate choice of phosphors used in fluorescent tubes which, in combination with the colour filter and pixels, results in relatively small spectral spreading of the light from the holographic elements.

Figure 27:
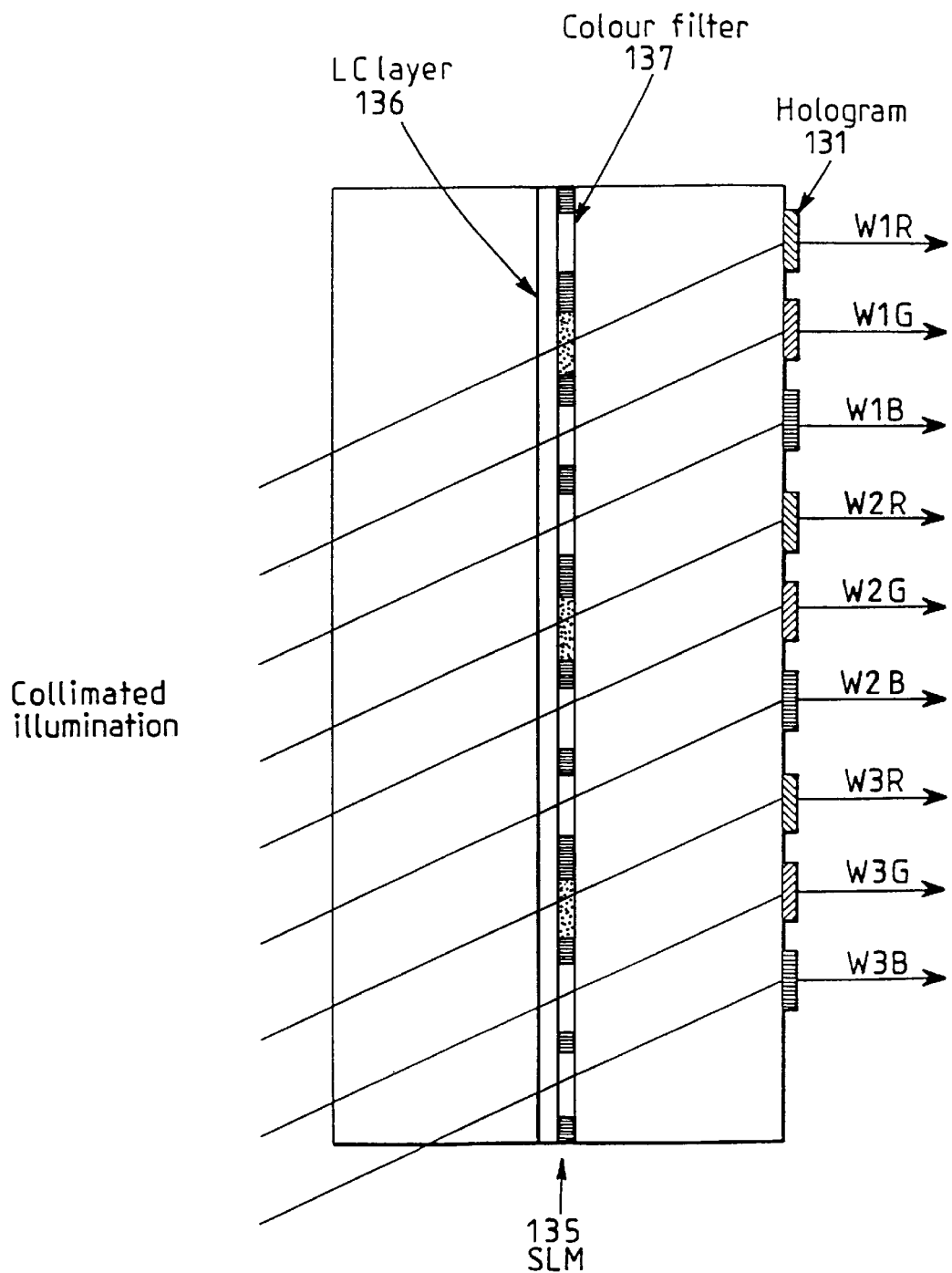
FIG. 27 is a schematic sectional view of part of a display using an external hologram.

FIG. 27 shows an alternative arrangement in which the hologram 131 is disposed on the outer surface of the SLM 135. In this arrangement, by using collimated illumination, it is possible to make use of holograms formed in a photopolymer or dichromated gelatine or in the form of etched surface relief or embossed holograms. Alternatively, by controlling the structure of electrodes within each pixel of the SLM135, gratings may be created in the SLM.

The holograms 131 may be computer generated or may be recorded by interfering light from an illuminated window with a reference beam. For instance, a mask may be used to expose a recording plate at the first window of each lobe through a red colour filter together with a red reference beam. This may then be repeated for green and blue light. The process then may be repeated for each window and each corresponding holographic element.

Figure 28:
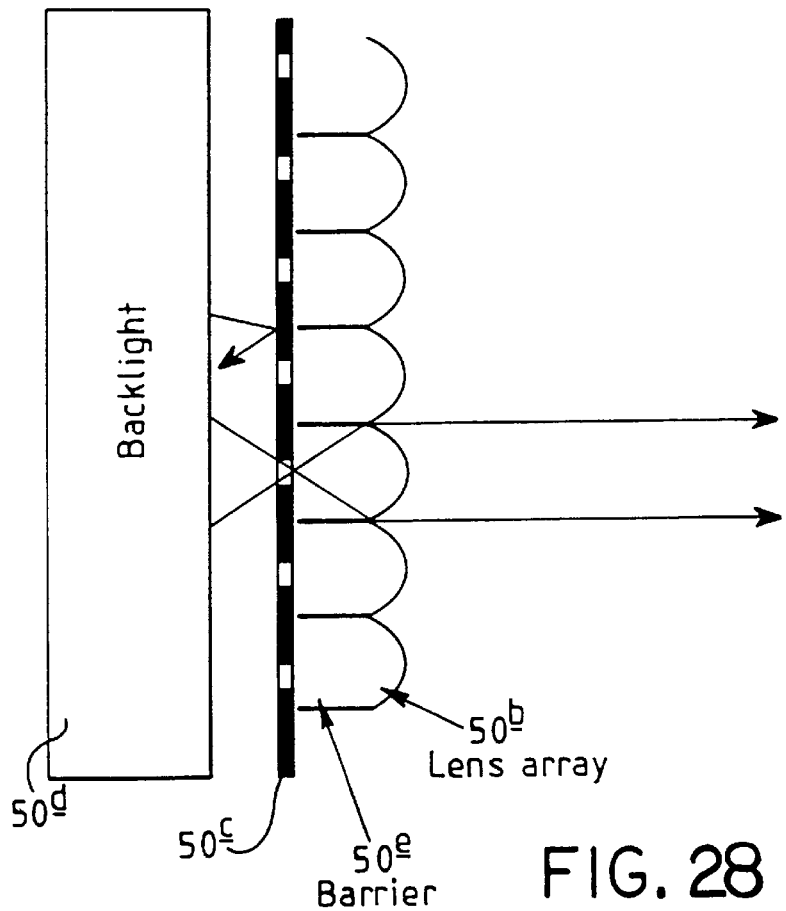
FIGS. 28 and 29 are schematic sectional views of compact backlight for illuminating holograms.

FIG. 28 illustrates a compact collimated white backlight which may be used for illuminating the holograms 131. The backlight shown in FIG. 28 differs from that shown in FIG. 21 in that barriers 50e are arranged between elements of the lens array 50b and the lens array 50b is arranged to produce collimated light. The rear surface of the barrier 50c is made reflective so as to return unused light to the backlight illuminator 50d for reuse.

Figure 29:
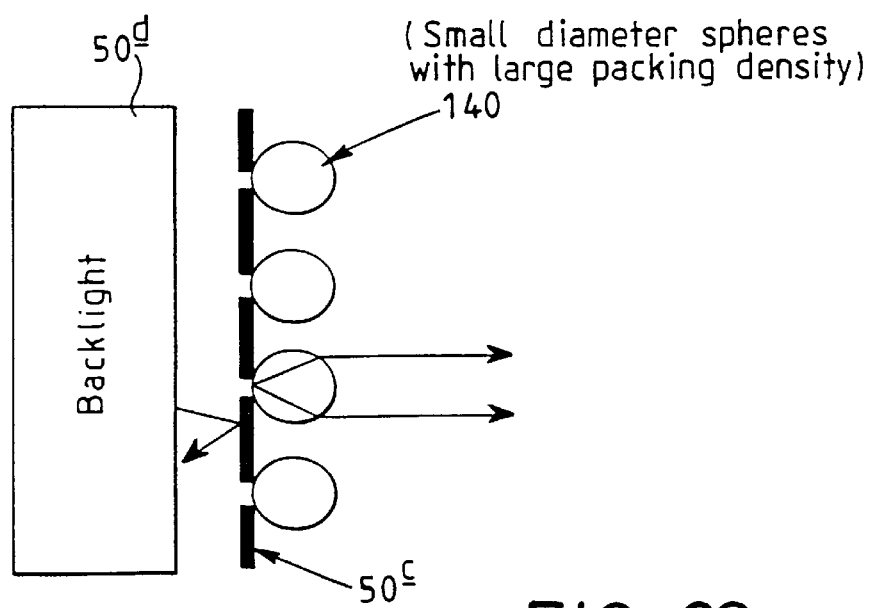

FIG. 29 shows a collimated backlight which differs from that shown in FIG. 28 in that the lens array 50b and the barrier 50e are replaced by small glass spheres 140 having a large packing density. As another alternative, it is possible to produce collimated light by means of an edge lit hologram.

Figure 30:
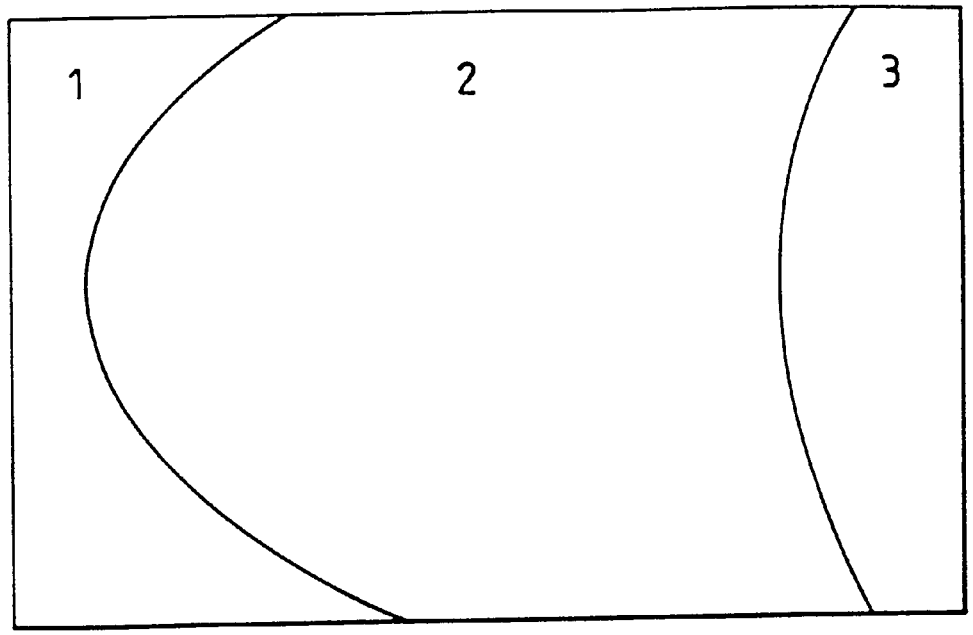
FIG. 30 illustrates the use of curves view slice edges for compensating for aberrations.
Figure 30:
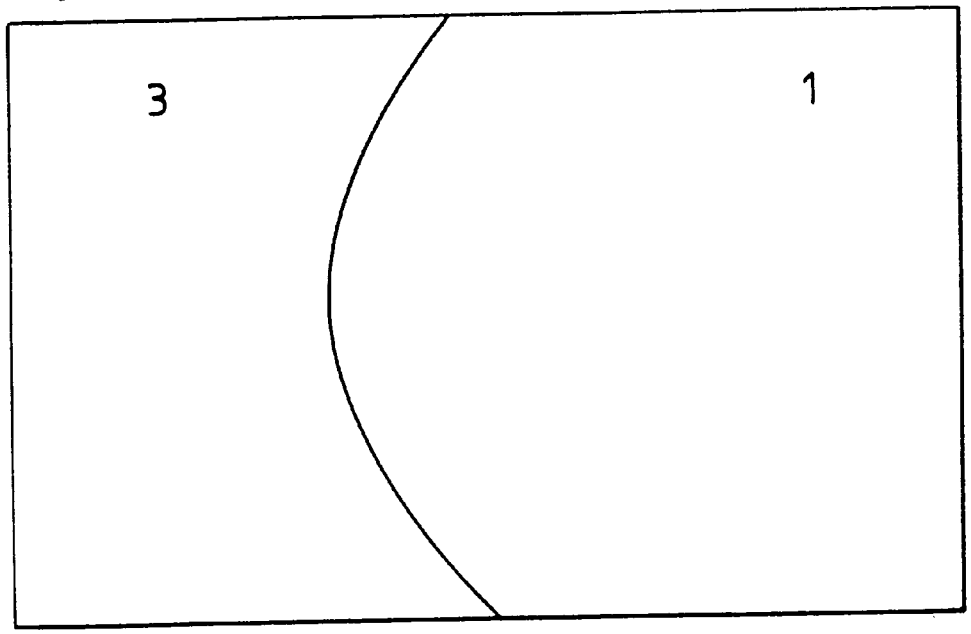

In practical displays, aberrations and thickness variations and distortions of the optical components may result in curved fringes for off-axis positions rather than straight fringes. This is illustrated in FIG. 30, which shows the boundaries between different view information for the left and right eye images, these boundaries being curved instead of being vertical lines. In order to compensate for this, the display may be configured so that different parts have different image information so that the information displayed across the display is appropriate for maintaining an autostereoscopic image at the observer.

It is thus possible to provide an observer tracking autostereoscopic display having no moving parts. Such a display is more robust and offers quicker response compared to a display incorporating moving parts. Such a display is also relatively insensitive to errors in the tracking of the observer.

The functions of a non-mechanical, electronic, lateral and longitudinal tracking method and a mechanical tracking method (for example, translating a parallax element, for example a parallax barrier or a lenticular screen with respect to an SLM or rotating a sandwich comprising at least a parallax element and an SLM in a flat panel type display) can be combined. It is thus possible to obtain good aberrational performance from the mechanical tracking method (the images of an observer's eye through the parallax barrier at the plane of the SLM are kept at or near the centre of the SLM pixels) as well as speed and extended viewing freedom from the non-mechanical tracking method. In this way, as an observer moves to a new position, a relatively slow mechanical system can either translate the parallax barrier or lenticular screen with respect to the SLM, or rotate the sandwich. Further, the non-mechanical tracking method working in conjunction with the mechanical tracking method allows the observer to maintain an autostereoscopic image throughout with extended longitudinal viewing freedom which is not possible if only the mechanical method is used.

What is claimed is:

1. An observer tracking autostereoscopic display comprising;
   at least three image display devices arranged to direct respective images along respective different directions,
   an observer tracker for determining a position of at least one observer, and
   an image controller for dividing the images displayed by each of the image display devices,
   wherein the image controller is responsive to the observer tracker such that first regions of each of the image display devices which emit light towards a left eye of the at least one observer display left eye view data and second regions of each of the image display devices which emit light towards a right eye of the observer display right eye view data.

2. An observer tracking autostereoscopic display as claimed in claim 1, wherein the observer tracker is arranged to determine positions of a plurality of observers, there are provided at least three image display devices per one of a plurality of observers, and the image controller is arranged to divide the images displayed by each of the image display devices such that first regions of the image display devices which emit light towards the left eyes of the observers display left eye view data and second regions of the image display devices which emit light towards the right eyes of the observers display right eye view data.

3. An observer tracking autostereoscopic display as claimed in claim 1, wherein each of the image display devices is arranged to direct the respective image in a plurality of lobes.

4. An observer tracking autostereoscopic display as claimed in claim 3, wherein any one of the lobes of the image display devices are interlaced with each other.

5. An observer tracking autostereoscopic display as claimed in claim 4, wherein the lobes are substantially contiguous.

6. An observer tracking autostereoscopic display as claimed in claim 1, wherein the image display devices are spatially multiplexed within a single display device.

7. An observer tracking autostereoscopic display as claimed in claim 6, wherein the single display device comprises a lenticular screen and a spatial light modulator comprising repeating regions of N columns, where N is the number of the image display devices and is equal to or greater than three, each region of N columns being adjacent a respective lenticule of the lenticular screen.

8. An observer tracking autostereoscopic display as claimed in claim 6, wherein the spatial light modulator illuminated by at least two individually controllable light sources arranged to operate in a time multiplexed manner and the spatial light modulator is arranged to operate in a time multiplexed manner.

9. An observer tracking autostereoscopic display as claimed in claim 8, wherein the spatial light modulator is disposed between first and second lenticular arrays, the first lenticular array having first pitch substantially equal to a pixel pitch of the spatial light modulator and the second lenticular array having second pitch substantially equal to an integer multiple of the pitch of the first lenticular array.

10. An observer tracking autostereoscopic display as claimed in claim 9, wherein the second pitch of the second array is substantially equal to twice the first pitch of the first array.

11. An observer tracking autostereoscopic display as claimed in claim 1, wherein the at least three image display devices comprises respective spatial light modulators illuminated by respective light sources having at least two spaced light emitting regions, at least one beam combiner for combining light from the spatial light modulators.

12. An observer tracking autostereoscopic display as claimed in claim 1, wherein the image display devices are temporally multiplexed by a single spatial light modulator cooperating with at least three individually controllable light sources operated in a sequence.

13. An observer tracking autostereoscopic display as claimed in claim 12, wherein each of the light sources comprises at least two light emitting regions.

14. An observer tracking autostereoscopic display as claimed in claim 12 further comprising a lenticular array for directing light from the light sources in different directions.

15. An observer tracking autostereoscopic display as claimed in claim 1, wherein the image controller varies a spatial size and position of the first and second regions of the image display devices responsive to the observer tracker.

16. A method of tracking an observer with an autostereoscopic display of the type comprising at least three image display devices which direct respective images along respective different directions, comprising steps of
   tracking a position of at least one of observers, and
   dividing the image displayed by each of the at least three image display devices such that first regions of the image display devices which emit light towards a left eye of the at least one of the observers display left eye view data and second regions of the image display devices which emit light towards a right eye of the at least one of observers display right eye view data.

17. An observer tracking autostereoscopic display comprising:
   at least a first image display device, a second image display device, and a third image display device, wherein the first, second and third image display devices are operatively configured such that the first image display device displays a first image to a first range of directions, the second image display device displays a second image to a second range of directions, and the third image display device displays a third image to a third range of directions;
   an observer tracker for determining a position of an observer relative to the autostereoscopic display; and an image controller which divides each of the first, second and third images into at least one left eye image data region containing left eye view data and at least one right eye image data region containing right eye view data, the image controller varying a composite content of the at least one left eye image data region and the at least one right eye image data region in at least one of the first, second and third images as a function of observer position information provided by the observer tracker, such that as the position of the observer varies the respective left eye image data regions and the right eye image data regions of the first, second, and third images as distributed and displayed among the first, second and third image display devices combine to direct the left eye view data included among the first, second and third images towards the left eye of the observer and the right eye view data included among the first, second and third images towards the right eye of the observer.

18. An observer tracking autostereoscopic display as claimed in claim 17, wherein the image controller varies a spatial size and position of the at least one left eye image data region and the at least one right eye image data region in at least one of the first, second and third images as a function of observer position information provided by the observer tracker.

19. An observer tracking autostereoscopic display as claimed in claim 18, wherein by varying the spatial size and position the image controller functions to provide a greater longitudinal viewing freedom of the display.

* * * * *